(12) United States Patent
Wu

(10) Patent No.: US 11,694,645 B2
(45) Date of Patent: Jul. 4, 2023

(54) ARRAY SUBSTRATE AND DRIVING METHOD THEREOF, DISPLAY PANEL AND DISPLAY DEVICE

(71) Applicant: Xiamen Tianma Micro-Electronics Co., Ltd., Xiamen (CN)

(72) Inventor: Hao Wu, Xiamen (CN)

(73) Assignee: Xiamen Tianma Micro-Electronics Co., Ltd., Xiamen (CN)

( * ) Notice: Subject to any disclaimer, the term of this patent is extended or adjusted under 35 U.S.C. 154(b) by 225 days.

(21) Appl. No.: 17/420,091

(22) PCT Filed: Jul. 24, 2020

(86) PCT No.: PCT/CN2020/103971
§ 371 (c)(1),
(2) Date: Jun. 30, 2021

(87) PCT Pub. No.: WO2021/243830
PCT Pub. Date: Dec. 9, 2021

(65) Prior Publication Data
US 2022/0319460 A1 Oct. 6, 2022

(30) Foreign Application Priority Data
Jun. 5, 2020 (CN) .......................... 202010507880.7

(51) Int. Cl.
*G09G 3/30* (2006.01)
*G09G 3/36* (2006.01)
*G02F 1/1362* (2006.01)

(52) U.S. Cl.
CPC ..... *G09G 3/3648* (2013.01); *G02F 1/136286* (2013.01); *G09G 2300/0465* (2013.01);
(Continued)

(58) Field of Classification Search
CPC ..................... G09G 3/3648; G09G 2320/0252
See application file for complete search history.

(56) References Cited

U.S. PATENT DOCUMENTS

2014/0362323 A1* 12/2014 Nakano ................. G02F 1/1368
257/59
2015/0129984 A1* 5/2015 Cheng ............... G02F 1/136286
257/401
(Continued)

FOREIGN PATENT DOCUMENTS

CN 106950771 A 7/2017
CN 109979317 A 7/2019

OTHER PUBLICATIONS

International Search Report for related Application No. PCT/CN2020/103971; report dated Mar. 17, 2021.

*Primary Examiner* — Sanghyuk Park
(74) *Attorney, Agent, or Firm* — von Briesen & Roper, s.c.

(57) ABSTRACT

Disclosed is an array substrate. The array substrate includes a substrate and a pixel unit array. A first side of each row of pixel units is provided with a first scanning line corresponding to the row of pixel units, and the first scanning line is connected to switch elements of first-type pixel units in the row of pixel units; and the second side of each row of pixel units is provided with a second scanning line corresponding to the row of pixel units, and the second scanning line is connected to switch elements of second-type pixel units in the row of pixel units. An active layer structure of the switch element of a second-type pixel unit in an $i^{th}$ row of pixel units has a common region with an active layer structure of the switch element of a first-type pixel unit in an $(i+1)^{th}$ row of pixel units.

20 Claims, 18 Drawing Sheets

(52) U.S. Cl.
CPC ............ *G09G 2310/0202* (2013.01); *G09G 2320/0252* (2013.01); *G09G 2380/10* (2013.01)

(56) References Cited

U.S. PATENT DOCUMENTS

2019/0156744 A1\* 5/2019 Song .................... G09G 3/3233
2020/0285088 A1\* 9/2020 Xu ..................... G02F 1/136209

\* cited by examiner

ARRAY SUBSTRATE AND DRIVING METHOD THEREOF, DISPLAY PANEL AND DISPLAY DEVICE

CROSS-REFERENCE TO RELATED APPLICATION

This Application is a National Stage Application, filed under 35 U.S.C. 371, of International Patent Application No. PCT/CN2020/103971, filed on Jul. 24, 2020, which claims priority to Chinese Patent Application No. 202010507880.7 filed with the CNIPA on Jun. 5, 2020, the disclosures of which are incorporated herein by reference in their entireties.

This application claims priority to Chinese Patent Application No. 202010507880.7 filed with the CNIPA on Jun. 5, 2020, the disclosure of which is incorporated herein by reference in its entirety.

TECHNICAL FIELD

The present application relates to the field of display technologies, for example, an array substrate and a driving method thereof, a display panel and a display device.

BACKGROUND

Thin film transistor liquid crystal panels (TFT-LCDs) are widely used in modern information equipment such as televisions, notebooks, mobile phones, and personal digital assistants because of advantages of light weight, thin size, and low power consumption. The application of liquid crystal display panels in the market becomes more and more important.

An array substrate of the TFT-LCD in the related art includes pixel units arranged in an array. One scanning line is disposed between every adjacent two rows of pixel units, and one data line is disposed between every two adjacent columns of pixel units. The pixel units are disposed within regions formed by intersections of the scanning lines and the data lines and are driven by corresponding scanning lines and corresponding data lines. As the size of the display panel increases, the number of scanning lines and data lines greatly increases, resulting in a relatively large load on the scanning lines and a relatively large parallel capacitance of the scanning lines.

In order to reduce the load on the scanning lines, two scanning lines may be disposed for each row of pixel units to jointly drive the same row of pixel units, thus effectively reducing the load on the scanning lines. However, the setting of double scanning lines for each row of pixel units causes a relatively large width of black matrix regions between pixel units, resulting in a relatively low screen display rate.

SUMMARY

The present application provide an array substrate, a driving method of the array substrate, a display panel and a display device to avoid a relatively low screen display rate due to the setting of double scanning lines.

An array substrate is provided in the present application and includes a substrate and a pixel unit array disposed on the substrate, and each pixel unit in the pixel unit array includes a pixel electrode and a switch element.

The substrate is further provided with scanning lines arranged in a row direction and data lines arranged in a column direction, two of the scanning lines are disposed between two adjacent rows of pixel units, and one of the data lines is disposed between two adjacent columns of pixel units; a control end of the switch element is connected to one of the scanning lines corresponding to the switch element, a first end of the switch element is connected to one of the data lines corresponding to the switch element, and a second end of the switch element is connected to the pixel electrode of the pixel unit to which the switch element belongs.

Each row of pixel units includes a first side and a second side opposite to each other, the first side of each row of pixel units is provided with a first scanning line corresponding to the row of pixel units, and the first scanning line corresponding to each row of pixel units is connected to switch elements of first-type pixel units in the row of pixel units; and the second side of each row of pixel units is provided with a second scanning line corresponding to the row of pixel units, and the second scanning line corresponding to each row of pixel units is connected to switch elements of second-type pixel units in the row of pixel units. The switch elements of the first-type pixel units in each row of pixel units are disposed on one side of the row of pixel units close to the first scanning line corresponding to the row of pixel units, and the switch elements of the second-type pixel units in each row of pixel units are disposed on one side of the row of pixel units close to the second scanning line corresponding to the row of pixel units.

In a direction perpendicular to the row direction, an active layer structure of the switch element of a second-type pixel unit in an $i^{th}$ row of pixel units has a common region with an active layer structure of the switch element of a first-type pixel unit in an (i+1)th row of pixel units, and the common region is located between the second scanning line corresponding to the $i^{th}$ row of pixel units and the first scanning line corresponding to the $(i+1)^{th}$ row of pixel units, and i is an integer greater than or equal to 1.

A driving method of an array substrate is further provided in the present application and applied to the array substrate of any embodiment of the present application. The method includes steps described below.

Multiple rows of pixel units are scanned row by row through scanning lines.

For one currently scanned row of the multiple rows of pixel units, the same scanning signal is inputted to the first scanning line corresponding to the one currently scanned row of pixel units and the second scanning line corresponding to the one currently scanned row of pixel units.

A display panel is further provided in embodiments of the present application and includes the array substrate provided in any embodiment of the present application.

A display device is further provided in the present application and includes the display panel provided in any embodiment of the present application.

DETAILED DESCRIPTION

Figure 1:
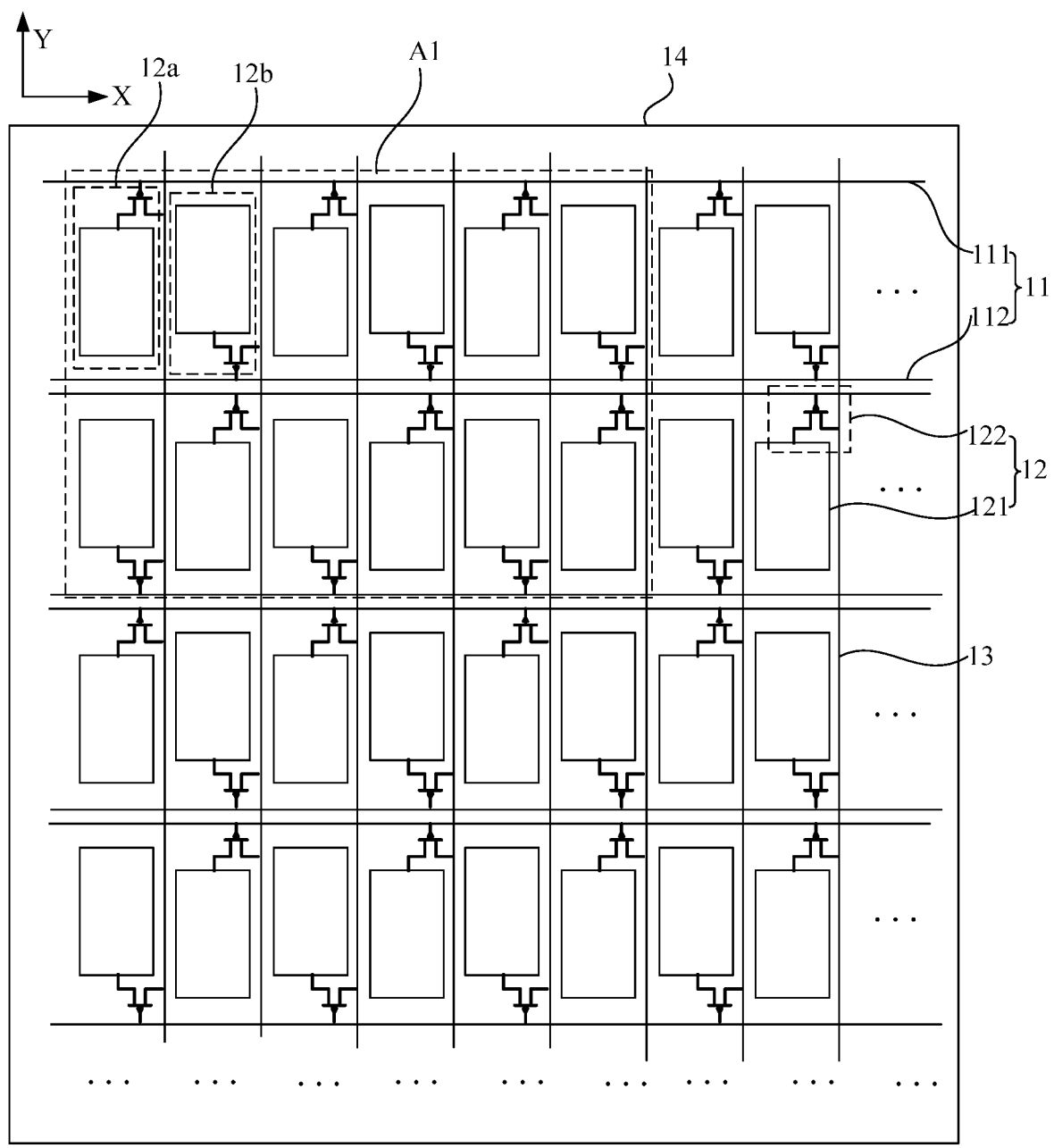
FIG. 1 is a structural diagram of an array substrate according to an embodiment of the present application.

The present application is described below in conjunction with drawings and embodiments. The embodiments described herein are merely intended to explain the present application and not to limit the present application. Additionally, for ease of description, only part, not all, of structures related to the present application are illustrated in the drawings.

An array substrate is provided in an embodiment of the present application and includes a substrate and a pixel unit array which is arranged along a row direction and a column direction and disposed on the substrate, and each pixel unit in the pixel unit array includes a pixel electrode and a switch element.

The substrate is further provided with scanning lines arranged in the row direction and data lines arranged in the column direction, two of the scanning lines are disposed between two adjacent rows of pixel units, and one of the data lines is disposed between two adjacent columns of pixel units, a control end of the switch element is connected to a scanning line corresponding to the switch element, a first end of the switch element is connected to a data line corresponding to the switch element, and a second end of the switch element is connected to the pixel electrode of a pixel unit to which the switch element belongs.

Each row of pixel units includes a first side and a second side opposite to each other, the first side of each row of pixel units is provided with a first scanning line corresponding to the row of pixel units, and the first scanning line corresponding to each row of pixel units is connected to switch elements of first-type pixel units in the row of pixel units; and the second side of each row of pixel units is provided with a second scanning line corresponding to the row of pixel units, and the second scanning line corresponding to each row of pixel units is connected to switch elements of second-type pixel units in the row of pixel units. The switch elements of the first-type pixel units in each row of pixel units are disposed on one side of the row of pixel units close to the first scanning line corresponding to the row of pixel units, and the switch elements of the second-type pixel units in each row of pixel units are disposed on one side of the row of pixel units close to the second scanning line corresponding to the row of pixel units.

In a direction perpendicular to the row direction, an active layer structure of the switch element of a second-type pixel unit in an $i^{th}$ row of pixel units has a common region with an active layer structure of the switch element of a first-type pixel unit in an (i+1)th row of pixel units, and the common region is located between the second scanning line corresponding to the $i^{th}$ row of pixel units and the first scanning line corresponding to the $(i+1)^{th}$ row of pixel units, and i is an integer greater than or equal to 1.

In the embodiment of the present application, the array substrate includes pixel units arranged in an array, and further includes the scanning lines arranged along the row direction and the data lines arranged along the column direction. Two scanning lines are disposed between two adjacent rows of pixel units, and one data line is disposed between two adjacent columns of pixel units. Each row of pixel units corresponds to two scanning lines, and the two scanning lines may scan the row of pixel units simultaneously. The first side of each row of pixel units is provided with the first scanning line corresponding to the row of pixel units, and the first scanning line corresponding to each row of pixel units is connected to first-type pixel units in the row of pixel units. The switch elements of the first-type pixel units are disposed on one side close to the first scanning line. The second side opposite to the first side is provided with the second scanning line corresponding to the row of pixel units, and the second scanning line corresponding to each row of pixel units is connected to second-type pixel units in the row of pixel units. Similarly, the switch elements of the second-type pixel units are disposed on one side close to the second scanning line; and in two adjacent rows of pixel units, an active layer structure of the switch element of a second-type pixel unit in the first row of two adjacent rows of pixel units has a common region with an active layer structure of the switch element of a first-type pixel unit in the second row of two adjacent rows of pixel units, and the common region is located between the second scanning line corresponding to the first row and the first scanning line corresponding to the second row, that is, the above common region is located in a light-shielding region between two adjacent rows of pixel units. The setting of the common region can effectively reduce the set width of the light-shielding region, thereby reducing an area of the light-shielding region and increasing the light-emitting area of the display screen. Under the same area of the display screen, the pixel density can be effectively improved, the screen display rate can be increased, and the image display effect can be improved.

The schemes in embodiments of the present application will be described below in conjunction with drawings in embodiments of the present application.

Figure 2:
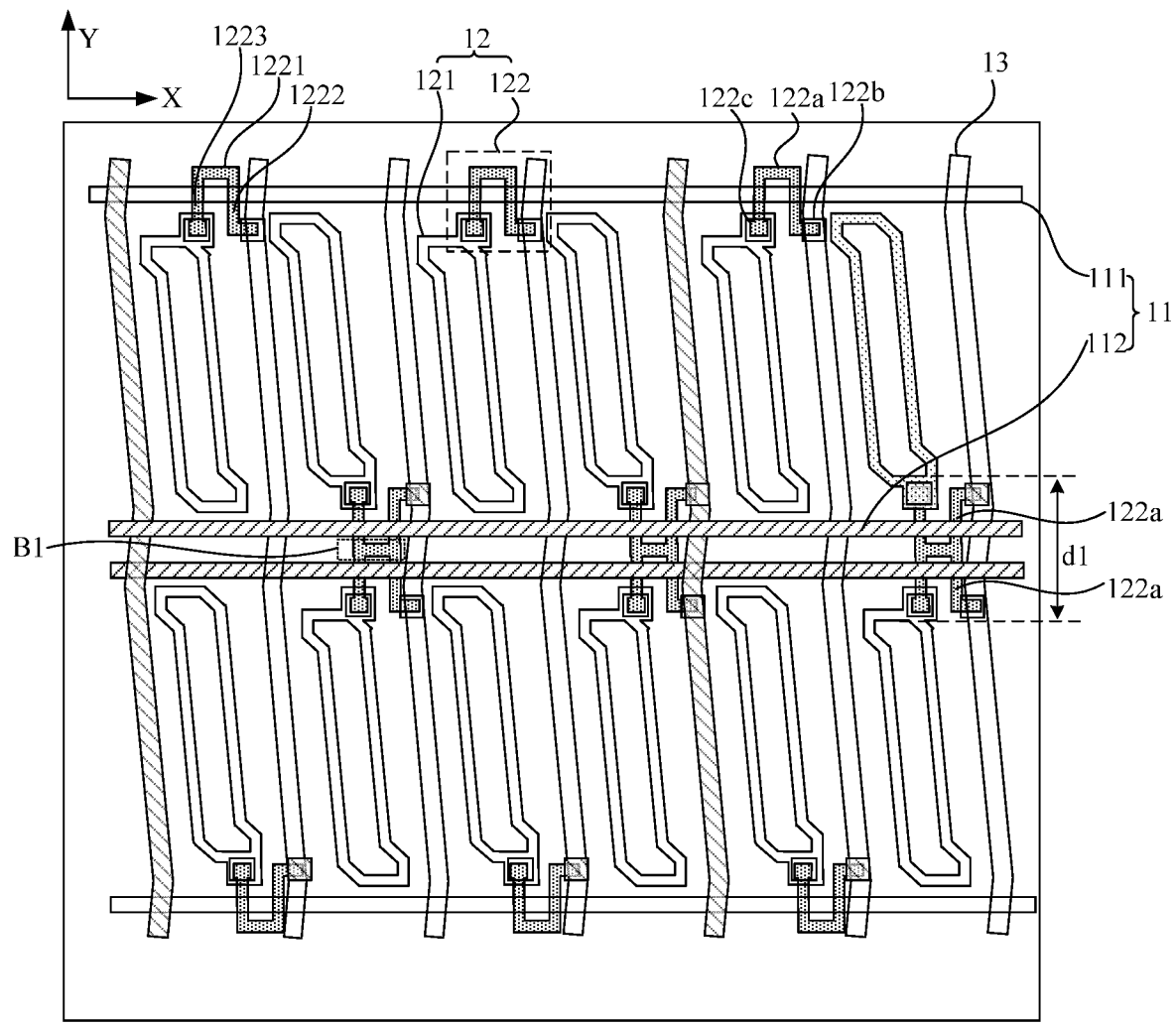
FIG. 2 is an enlarged structural view of local region A1 of the array substrate in FIG. 1.

FIG. 1 is a structural diagram of an array substrate according to an embodiment of the present application, and FIG. 2 is an enlarged structural view of local region A1 of the array substrate in FIG. 1. As shown in FIG. 1, the array substrate includes a substrate 14, and the substrate 14 is configured to support structure layers on the substrate 14 and provided with a pixel unit array arranged in an array. As shown in FIG. 1, pixel units 12 arranged in the array are arranged along the row direction X and the column direction Y, and the substrate 14 is further provided with scanning lines 11 extending along the row direction X and data lines 13 extending along the column direction Y. Scanning lines 11 are disposed between two adjacent rows of pixel units, and a data line 13 is disposed between two adjacent columns of pixel units. Each pixel unit 12 includes a pixel electrode 121 and a switch element 122 which correspond to the pixel unit 12, and the switch element 122 is connected to the pixel electrode 121. Each switch element 122 includes a control end, a first end and a second end. The control end of each switch element 122 is connected to the scanning line 11 corresponding to the switch element 122, the first end of each switch element 122 is connected to the data line 13 corresponding to the switch element 122, and the second end of each switch element 122 is connected to the pixel electrode 121 of a pixel unit 12 to which the switch element 122 belongs. When the switch element 122 is turned on, the data line 13 corresponding to the switch element 122 may transmit a data signal to the pixel electrode 121 through the first end of the switch element 122; when a switch element 122 is turned off, the data line 13 corresponding to the switch element 122 cannot transmit the data signal to the pixel electrode 121 through the first end of the switch element 122.

This embodiment uses the dual-gate design, that is, each row of pixel units corresponds to two scanning lines 11, the row of pixel units is divided into two parts, and each part of pixel units 12 corresponds to one of the two scanning lines 11, thus reducing the capacitive load of each scanning line 11. As shown in FIG. 1, each row of pixel units includes a first side and a second side opposite to each other, the first side of each row of pixel units is provided with a first scanning line 111 corresponding to the row of pixel units, and the second side of each row of pixel units is provided with a second scanning line 112 corresponding to the row of pixel units. Each row of pixel units includes first-type pixel units 12a and second-type pixel units 12b. Switch elements 122 of the first-type pixel units 12a in each row of pixel units are disposed on one side of the row of pixel units close to the first scanning line 111, that is, the switch elements 122 of the first-type pixel units 12a in each row of pixel units are disposed on one side of the row of pixel units close to the first side; similarly, switch elements 122 of the second-type pixel units 12b in each row of pixel units are disposed on one side of the row of pixel units close to the second scanning line 112, that is, the switch elements 122 of the second-type pixel units 12b in each row of pixel units are disposed on one side of the row of pixel units close to the second side. Thereby, the first-type pixel units 12a (control ends of switch elements 122 of the first-type pixel units 12a) in each row of pixel units are connected to the first scanning line 111 corresponding to the row of pixel units, and the second-type pixel units 12b (control ends of switch elements 122 of the second-type pixel units 12b) in each row of pixel units are connected to the second scanning line 112 corresponding to the row of pixel units. In each row of pixel units, the first scanning line 111 corresponding to the row of pixel units controls the first-type pixel units 12a, and the second scanning line 112 corresponding to the row of pixel units controls the second-type pixel units 12b, so that the loads connected to the first scanning line 111 and the second scanning line 112 are relatively small, which can adapt to the design of a larger size display screen. In an embodiment, in each row of pixel units, the number of first-type pixel units 12a and the number of second-type pixel units 12b are the same or similar so that the load on the first scanning line 111 of each row of pixel units and the load on the second scanning line 112 of the row of pixel units are balanced. In an embodiment, a scanning timing of the first scanning line 111 of each row of pixel units may be the same as a scanning timing of the second scanning line 112 of the row of pixel units, thereby shortening the scanning cycle of the scanning lines 11 and improving the image display effect.

Referring to FIG. 2, FIG. 2 shows the array substrate of FIG. 1 in detail. The switch element 122 includes an active layer structure 122a, a first end 122b and a second end 122c. In the plane where the array substrate is located, an overlapping portion between the active layer structure 122a and the first scanning line 111 corresponding to the active layer structure 122a is served as the control end of the switch element 122, in addition, the active layer structure 122a is connected to the first end 122b and the second end 122c to form a conductive channel of the switch element 122. In an embodiment, the switch element 122 is a thin film transistor including a gate electrode (equivalent to the control end), a source electrode (equivalent to the first end) and a drain electrode (equivalent to the second end).

Figure 3:
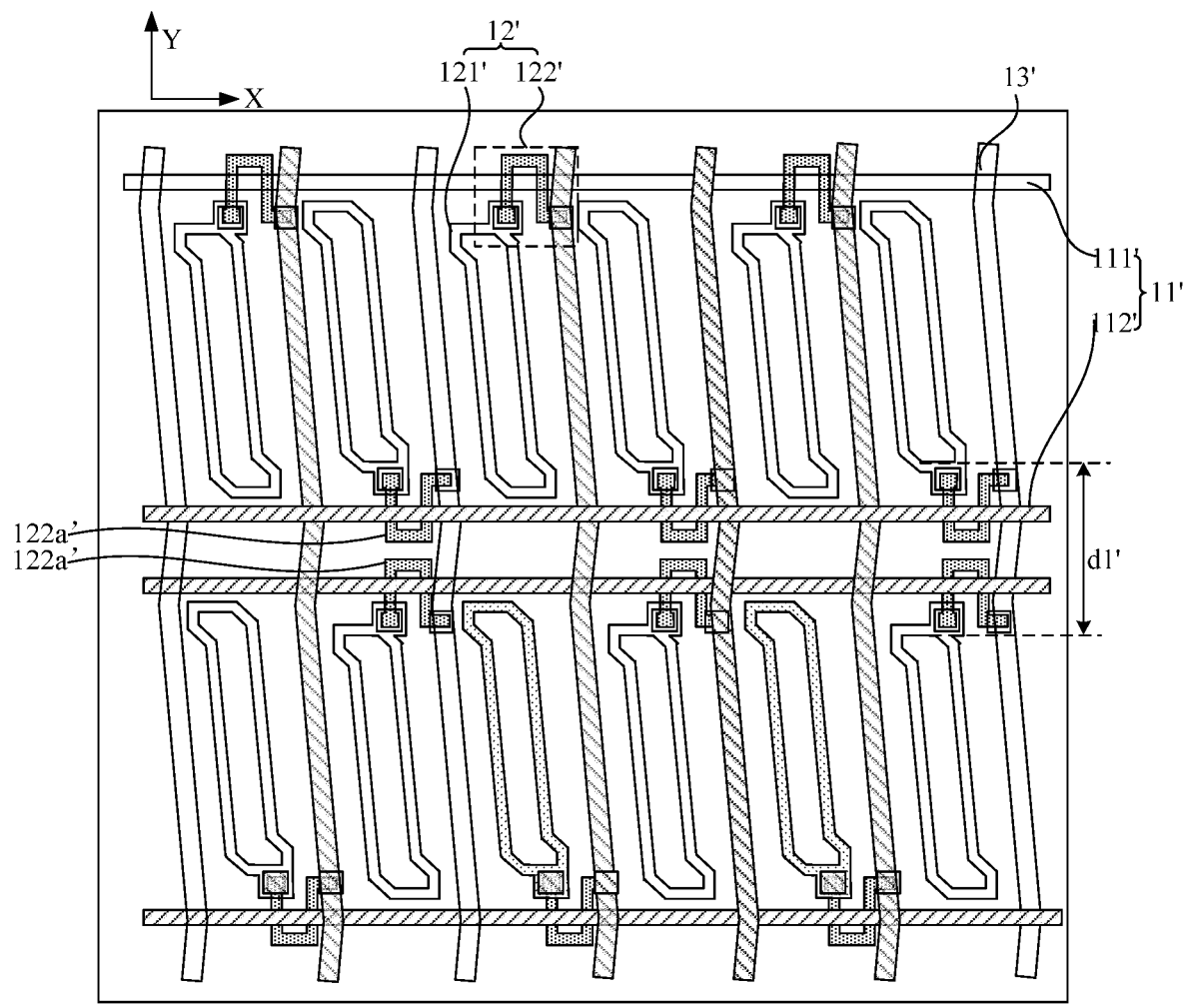
FIG. 3 is a structural diagram of a comparative example of an array substrate according to an embodiment of the present application.

In a direction perpendicular to the row direction X, an active layer structure 122a of the switch element 122 of a second-type pixel unit 12b in an $i^{th}$ row of pixel units has a common region B1 with an active layer structure 122a of the switch element 122 of a first-type pixel unit 12a in an (i+1)th row of pixel units, and the common region B1 is located between the second scanning line 112 corresponding to the $i^{th}$ row of pixel units and the first scanning line 111 corresponding to the (i+1)th row of pixel units, and i is an integer greater than 1. Therefore, the width d1 of the light-shielding region on the array substrate is reduced. FIG. 3 is a structural diagram of a comparative example of an array substrate according to an embodiment of the present application. Referring to FIG. 2 and FIG. 3, in FIG. 2, there is a common region B1 of the active layer structures 122a between two adjacent rows of pixel units, while in FIG. 3, there is no common region B1 of the active layer structures 122a' between two adjacent rows of pixel units, that is, the active layer structures 122a' of two adjacent rows of pixel units do not use the same segment region in the direction perpendicular to the row direction X. With continued reference to FIG. 2 and FIG. 3, the width d1 of the light-shielding region between two adjacent rows of pixel units in FIG. 2 is less than the width d1' of the light-shielding region between two adjacent rows of pixel units in FIG. 3, thus reducing the width of the light-shielding region and further reducing the area of the light-shielding region. Exemplarily, compared with the comparative example shown in FIG. 3, the scheme of the present embodiment shown in FIG. 2 can reduce the width of the light-blocking layer by 5 um to 10 um, increase the light-emitting area by 26% to 28%, effectively increase the pixel density of the display screen, and enhance the screen display effect.

In the present embodiment, the common region B1 refers to the same segment region which is perpendicular to the row direction X and occupied by a partial region of the active layer structure 122a of the switch element 122 in the $i^{th}$ row of pixel units and a partial region of the active layer structure 122a of the switch element 122 in the $(i+1)^{th}$ row of pixel units. There are two cases of the common region B1: the first case is that two active layer structures 122a of two switch elements 122 in two adjacent rows of pixel units are partially shared, as shown in FIG. 2; and the second case is that two active layer structures 122a of two switch elements 122 in two adjacent rows of pixel units are staggered and there is an overlapping region in the direction perpendicular to the row direction X.

Figure 4:
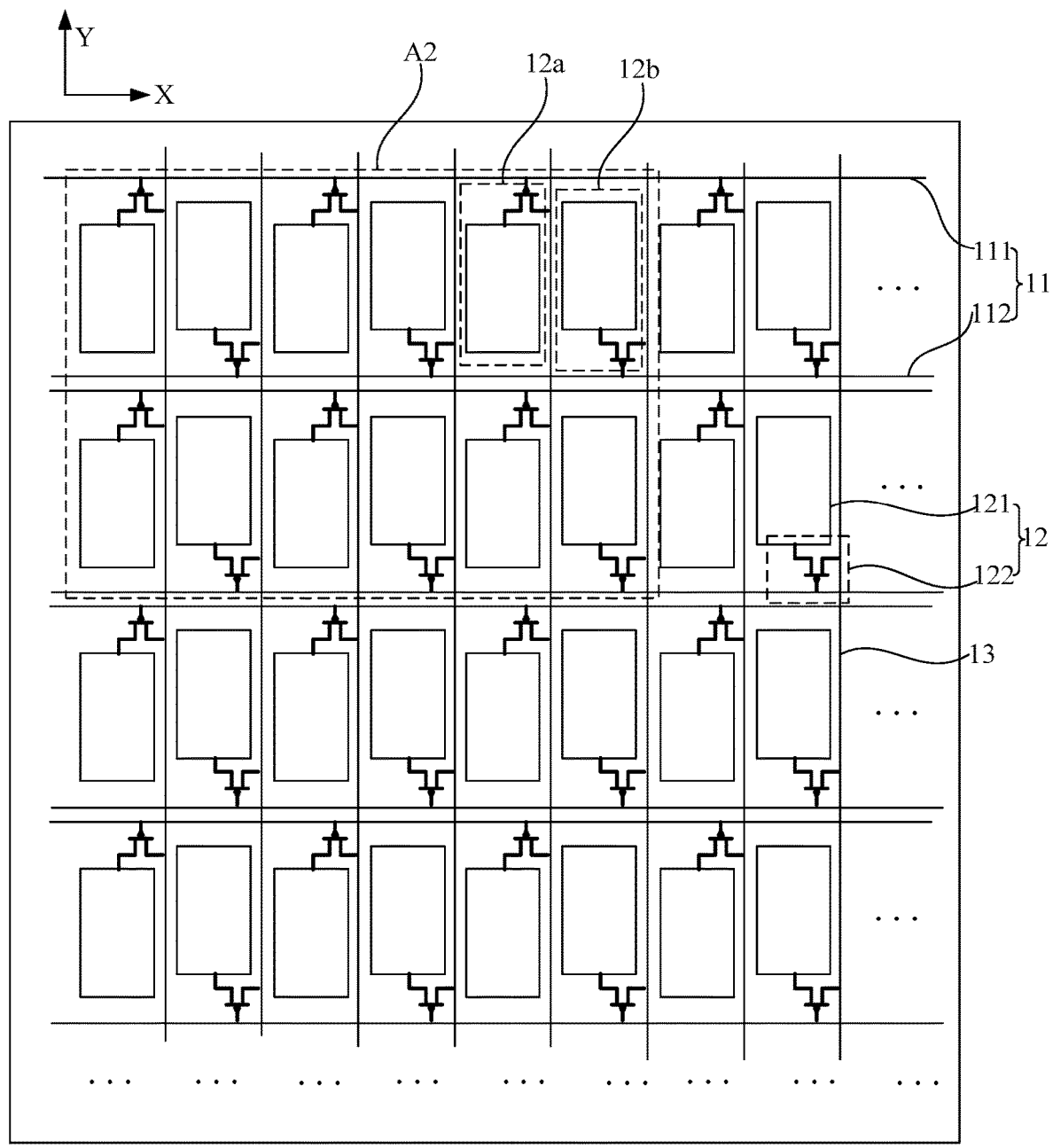
FIG. 4 is a structural diagram of another array substrate according to an embodiment of the present application.
Figure 5:
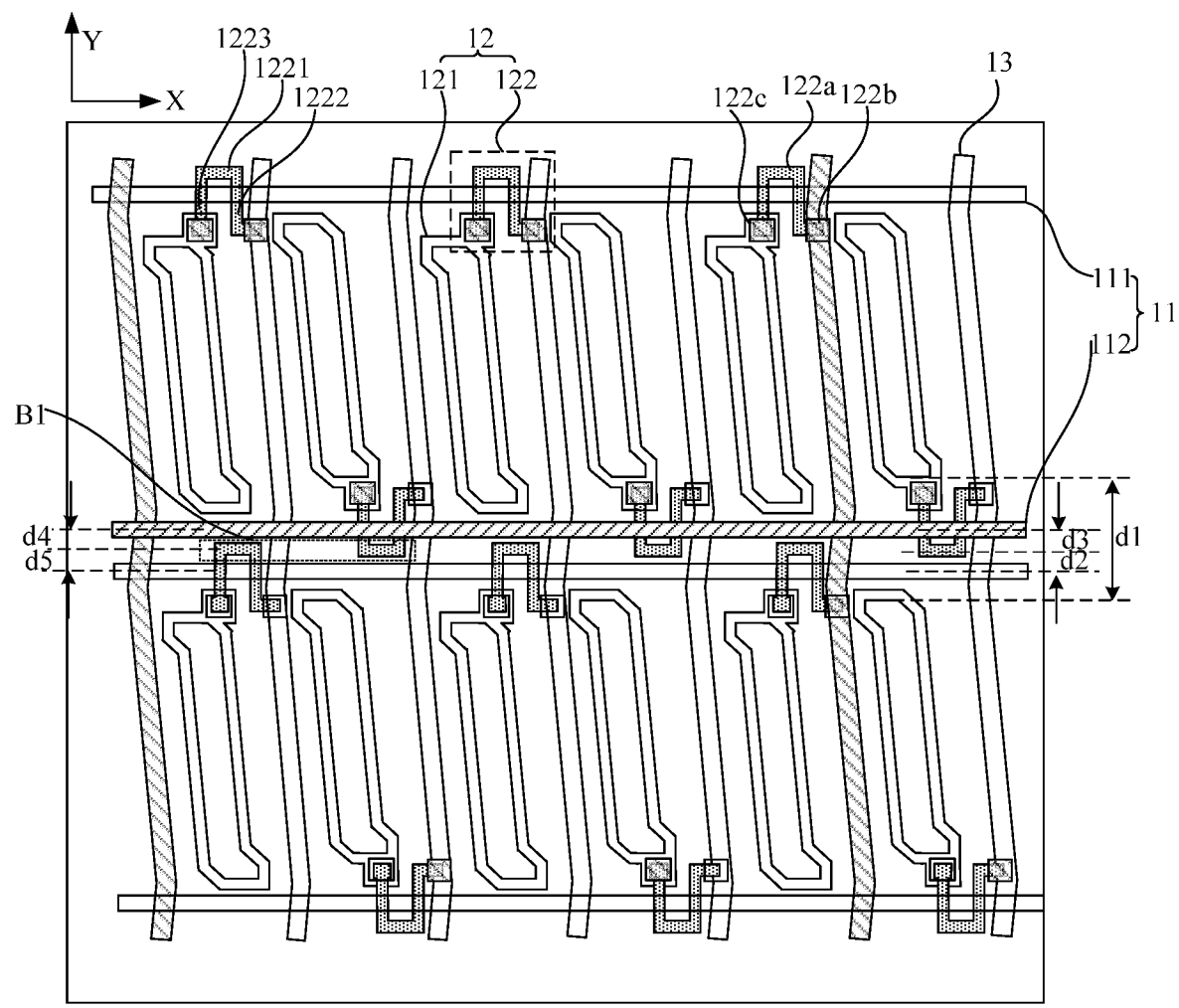
FIG. 5 is an enlarged structural view of local region A2 of the array substrate in FIG. 4.

FIG. 4 is a structural diagram of another array substrate according to an embodiment of the present application, and FIG. 5 is an enlarged structural view of local region A2 of the array substrate in FIG. 4. FIG. 4 shows the second case of the common region B1, a second-type pixel unit 12b in the $i^{th}$ row of pixel units is not located in the same column as a first-type pixel unit 12a in the $(i+1)^{th}$ row of pixel units. As shown in FIG. 5, the active layer structures 122a of the two switch elements 122 in two adjacent rows of pixel units are staggered, and the common region B1 is the overlapping region in the direction perpendicular to the row direction X.

First, the first case of the common region B1 is described in this embodiment.

In an embodiment, with continued reference to FIG. 1 and FIG. 2, multiple second-type pixel units 12b in an $m^{th}$ row of pixel units are arranged in one-to-one correspondence with multiple first-type pixel units 12a in an $(m+1)^{th}$ row of pixel units; and each second-type pixel unit 12b in the $m^{th}$ row of pixel units and the respective first-type pixel unit 12a in the $(m+1)^{th}$ row of pixel units corresponding to the second-type pixel unit 12b in the $m^{th}$ row of pixel units are located in the same column, and m is an integer greater than or equal to 1. In the same column of pixel units, the switch element 122 of a second-type pixel unit 12b in the $m^{th}$ row of pixel units shares one active layer structure 122a with the switch element 122 of a first-type pixel unit 12a in the $(m+1)^{th}$ row of pixel units.

As shown in FIG. 1 and FIG. 2, in two adjacent rows of pixel units, the number of second-type pixel units 12b in the $m^{th}$ row of pixel units is the same as the number of first-type pixel units 12a in the $(m+1)^{th}$ row of pixel units, the multiple second-type pixel units 12b in the $m^{th}$ row of pixel units are arranged in one-to-one correspondence with the multiple first-type pixel units 12a in the $(m+1)^{th}$ row of pixel units, and each second-type pixel unit 12b in the $m^{th}$ row of pixel units and the respective first-type pixel unit 12a in the $(m+1)^{th}$ row of pixel units corresponding to the second-type pixel unit 12b in the $m^{th}$ row of pixel units are located in the same column, so that each second-type pixel unit 12b and each first-type pixel unit 12a corresponding to each other can share one active layer structure 122a, thereby reducing the width d1 of the light-shielding region, reducing the fineness of the active layer structure 122a, and speeding up the manufacture process of the array substrate.

With continued reference to FIG. 1 and FIG. 2, in an embodiment, the active layer structure 122a may be a U-type structure, the U-type structure includes a bottom 1221, a first branch portion 1222 disposed on a first end of the bottom 1221 and a second branch portion 1223 disposed on a second end of the bottom 1221. The first branch portion 1222 is connected to the first end 122b of the switch element 122 to which the active layer structure 122a belongs, the second branch portion 1223 is connected to the second end 122c of the switch element 122 to which the active layer structure 122a belongs, and an overlapping portion between a scanning line 11 corresponding to the active layer structure 122a and the active layer structure 122a is the control end of the switch element 122 to which the active layer structure 122a belongs. In the same column of pixel units, the U-type structure of the switch element 122 of a second-type pixel unit 12b in the $m^{th}$ row of pixel units shares a bottom 1221 with the U-type structure of the switch element 122 of a first-type pixel unit 12a in the $(m+1)^{th}$ row of pixel units, and the bottom 1221 is provided in a region between the second scanning line 112 corresponding to the $m^{th}$ row of pixel units and the first scanning line 111 corresponding to the $(m+1)^{th}$ row of pixel units.

The active layer structure 122a may be set as the U-type structure, in two adjacent rows of pixel units, the U-type structure of a second-type pixel unit 12b in the $m^{th}$ row of pixel units has a common portion with the U-type structure of a first-type pixel unit 12a in the $(m+1)^{th}$ row of pixel units. As shown in FIG. 2, in two adjacent rows of pixel units sharing the active layer structure 122a, the bottoms 1221 of the U-type structures in two rows of pixel units are shared, and the bottoms 1221 are provided in regions between the second scanning line 112 corresponding to the $m^{th}$ row of pixel units and the first scanning line 111 corresponding to the $(m+1)^{th}$ row of pixel units, thus reducing the width of the light-shielding region. The U-type structure further includes the first branch portion 1222 disposed on the first end of the bottom 1221 and the second branch portion 1223 disposed on the second end of the bottom 1221. The first branch portion 1222 crosses the scanning line 11 corresponding to the U-type structure and is connected to the first end 122b of the switch element 122 to which the U-type structure belongs, the second branch portion 1223 crosses the scanning line 11 corresponding to the U-type structure and is connected to the second end 122c of the switch element 122 to which the U-type structure belongs, so in the plane where the array substrate is located, the active layer structure 122a has two portions overlapping the scanning line 11 corresponding to the active layer structure 122a to form the dual-gate structure, enhancing the switching speed of the switch element 122 and improving the transmission efficiency of the switch element 122.

Figure 6:
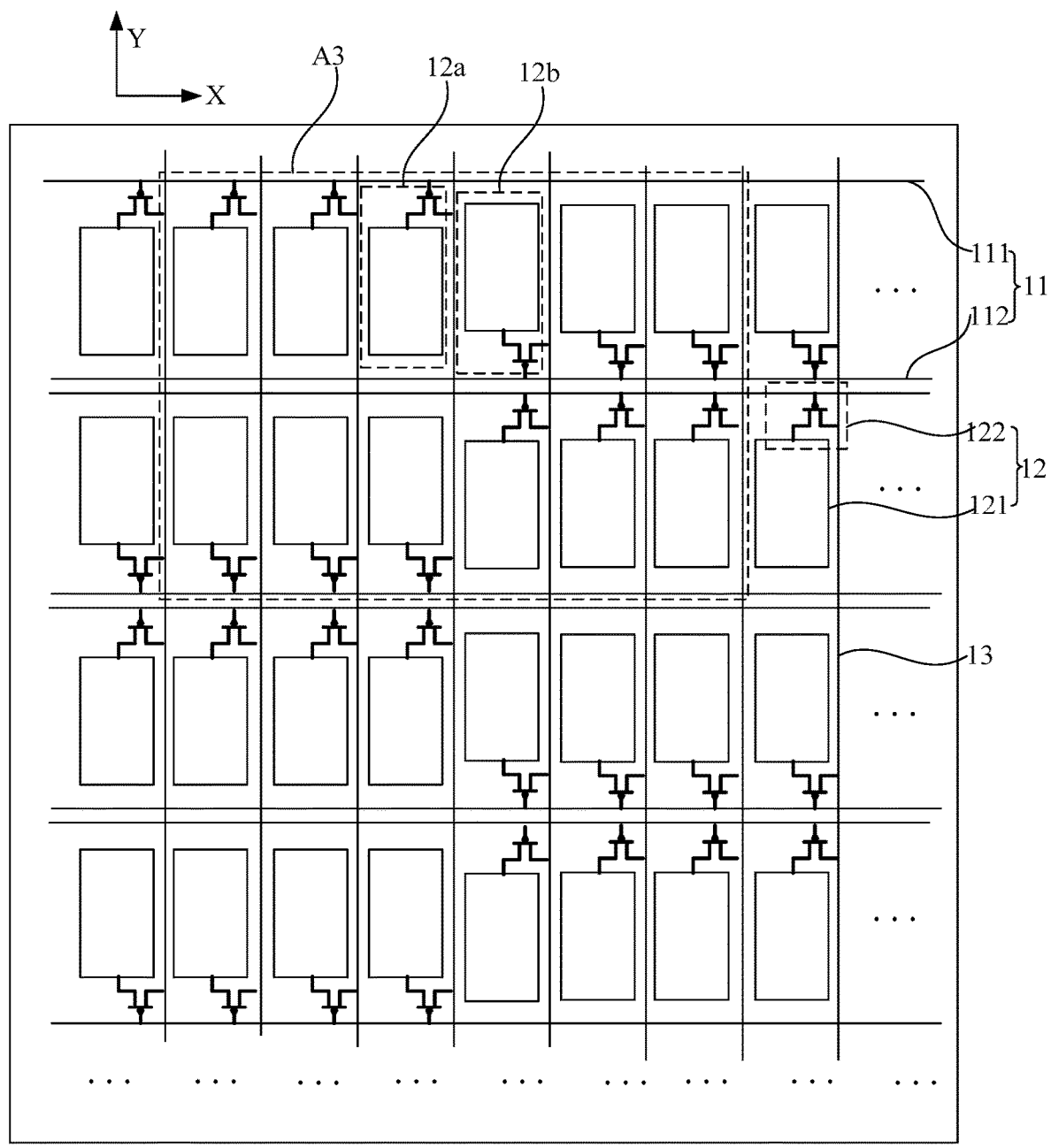
FIG. 6 is a structural diagram of another array substrate according to an embodiment of the present application.
Figure 7:
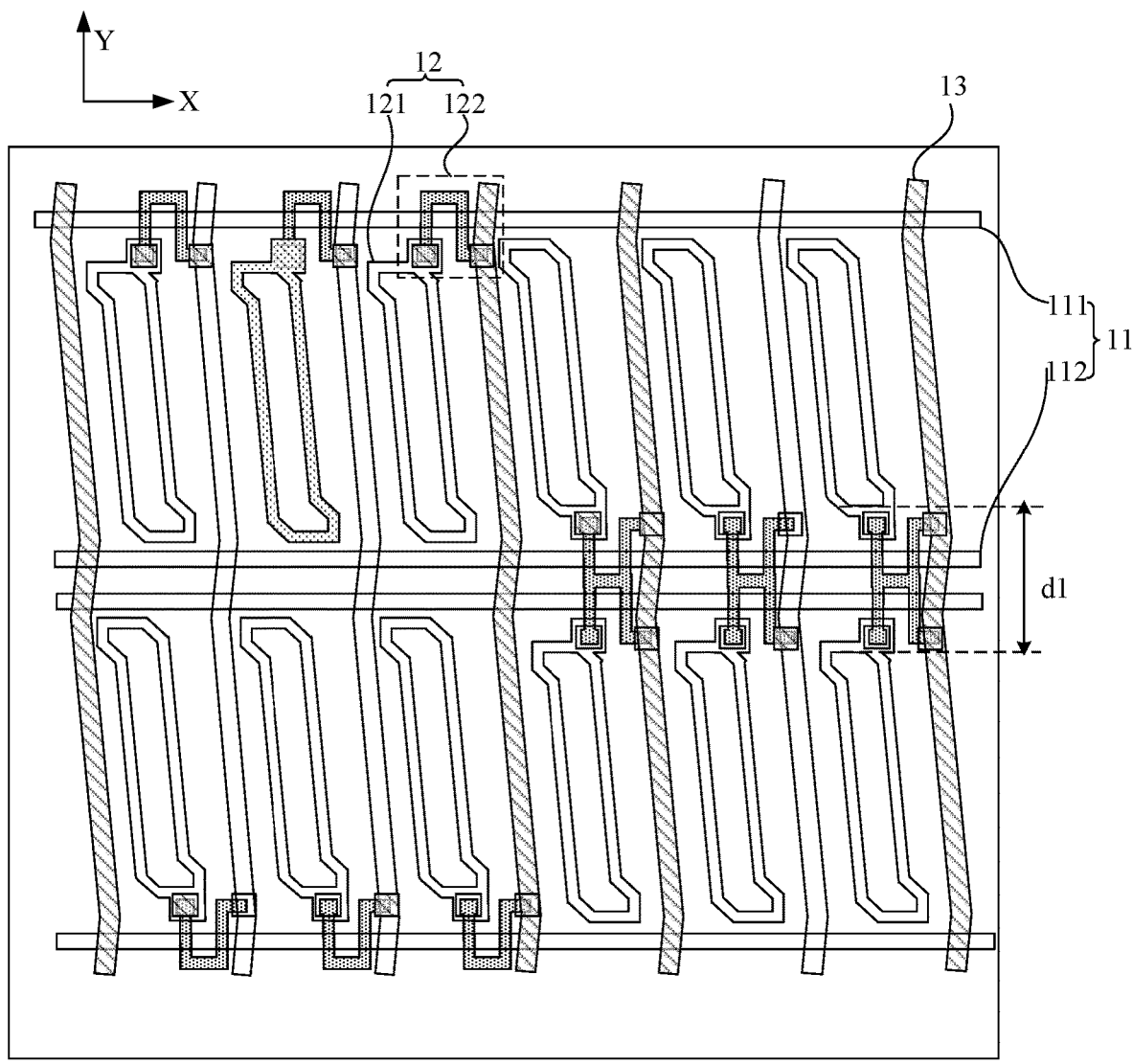
FIG. 7 is an enlarged structural view of local region A3 of the array substrate in FIG. 6.

FIG. 1 shows the case in which the first-type pixel units 12a and the second-type pixel units 12b in each row of pixel units are alternately disposed one by one. In the present embodiment, the setting of the first-type pixel units 12a and the second-type pixel units 12b in each row of pixel units may be irregular. Exemplarily, as shown in FIG. 6 and FIG. 7, FIG. 6 is a structural diagram of another array substrate according to an embodiment of the present application and FIG. 7 is an enlarged structural view of local region A3 of the array substrate in FIG. 6, the first-type pixel units 12a in each row of pixel units may be arranged at the front half and the second-type pixel units 12b in the row of pixel units may be arranged at the back half; alternatively, arranging several first-type pixel units 12a and then arranging several second-type pixel units 12b alternate in sequence. The present embodiment does not limit the set positions of the first-type pixel units 12a and the second-type pixel units 12b in each row of pixel units.

Furthermore, in the present embodiment, in order to accurately set each pixel unit 12, a certain rule may be set for the first-type pixel units 12a and the second-type pixel units 12b. With continued reference to FIG. 1, in an embodiment, in the $m^{th}$ row of pixel units, the first-type pixel units 12a are located in even columns, while the second-type pixel units 12b are located in odd columns; and in the $(m+1)^{th}$ row of pixel units, the first-type pixel units 12a are located in odd columns, and the second-type pixel units 12b are located in even columns. In the present embodiment, the first-type pixel units 12a and the second-type pixel units 12b in each row of pixel units may be alternately disposed one by one. For example, in the $m^{th}$ row of pixel units, the first-type pixel units 12a are located in even columns and the second-type pixel units 12b are located in odd columns, so in the $(m+1)^{th}$ row of pixel units adjacent to the $m^{th}$ row of pixel units, the first-type pixel units 12a are located in odd columns and the second-type pixel units 12b are located in even columns, thus each second-type pixel unit 12b in the $m^{th}$ row of pixel units shares one active layer structure 122a with the respective first-type pixel unit 12a in the $(m+1)^{th}$ row of pixel units corresponding to the second-type pixel unit 12b.

Figure 8:
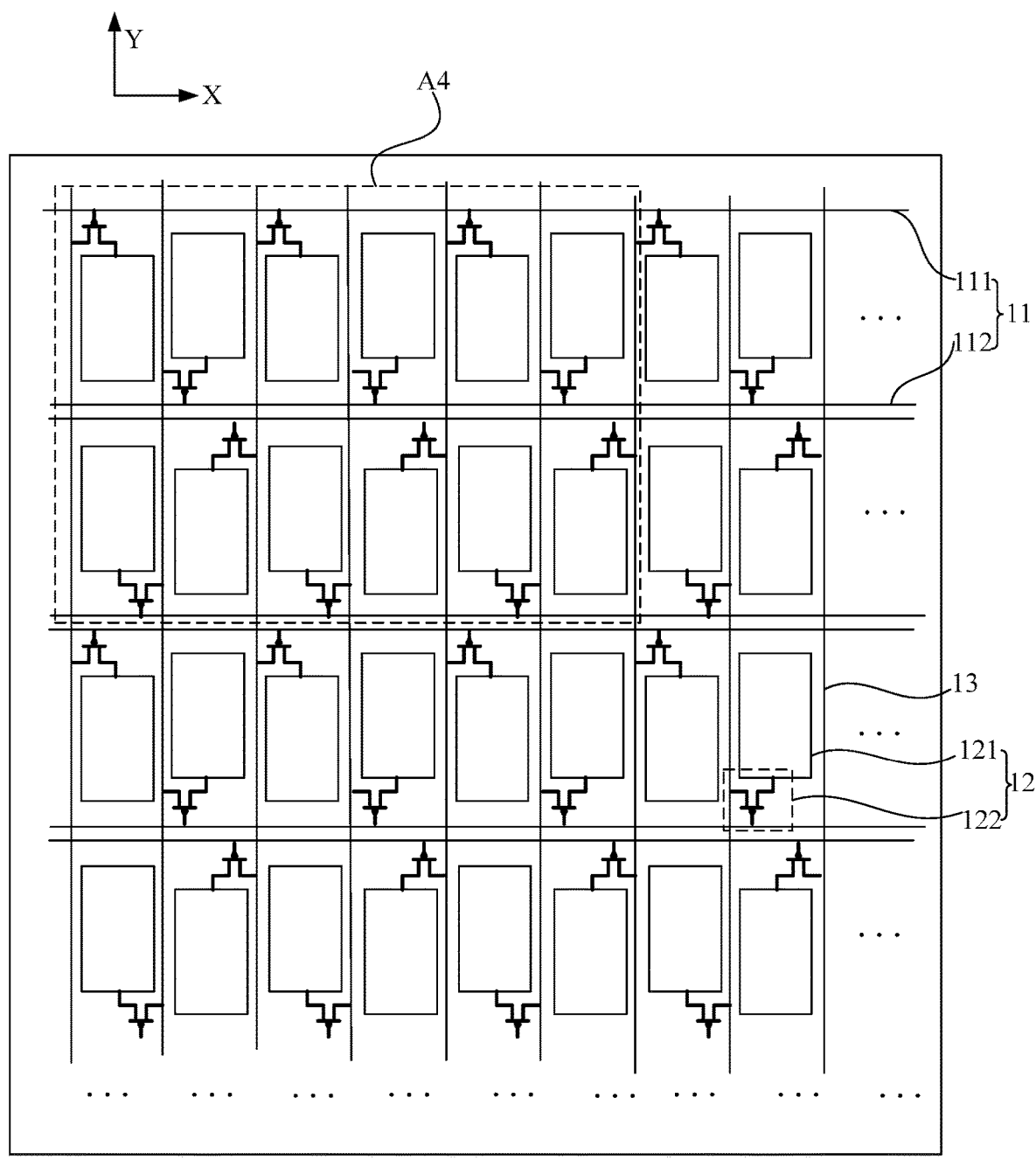
FIG. 8 is a structural diagram of another array substrate according to an embodiment of the present application.
Figure 9:
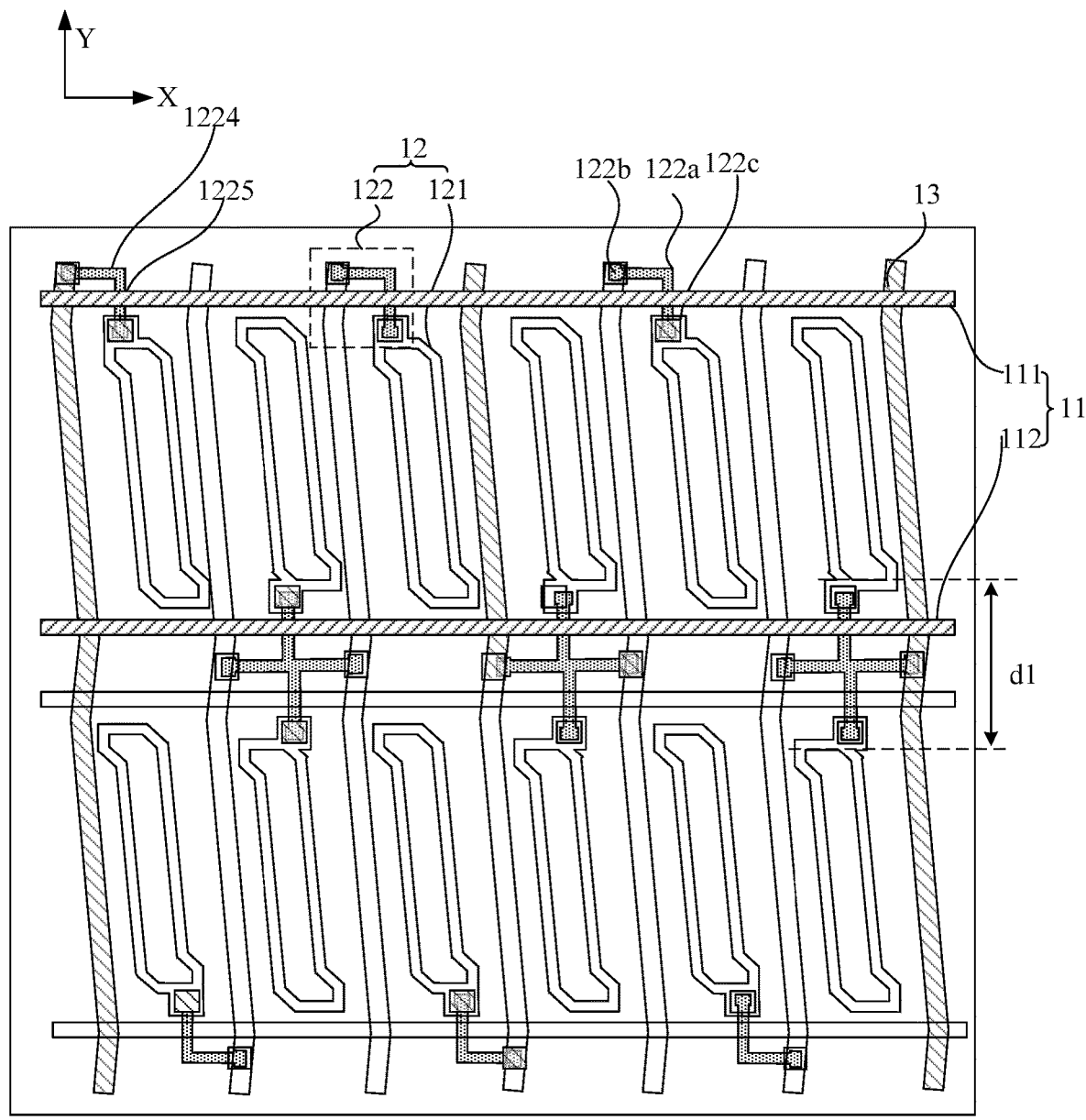
FIG. 9 is an enlarged structural view of local region A4 of the array substrate in FIG. 8.

FIG. 8 is a structural diagram of another array substrate according to an embodiment of the present application, and FIG. 9 is an enlarged structural view of local region A4 of the array substrate in FIG. 8. As shown in FIG. 8 and FIG. 9, in an embodiment, in the same column of pixel units, first ends 122b of two switch elements 122 in every two adjacent rows of pixel units are connected to different data lines 13. The active layer structure 122a is an L-type structure, and the L-type structure includes a third branch portion 1224 extending along the row direction X and a fourth branch portion 1225 extending along the column direction Y; a first end of the third branch portion 1224 is connected to the first end 122b of a switch element 122 to which the active layer structure 122a belongs, a second end of the third branch portion 1224 is connected to a first end of the fourth branch portion 1225, a second end of the fourth branch portion 1225 is connected to the second end 122c of the switch element 122 to which the active layer structure 122a belongs, and an overlapping portion between a scanning line 11 corresponding to the active layer structure 122a and the fourth branch portion 1225 is the control end of the switch element 122 to which the active layer structure 122a belongs. In the same column of pixel units, the second end of the third branch portion 1224 of the L-type structure in the switch element 122 of a second-type pixel unit 12b in the $m^{th}$ row of pixel units is shared with the second end of the third branch portion 1224 of the L-type structure in the switch element 122 of a first-type pixel unit 12a in the $(m+1)^{th}$ row of pixel units, and the second end of the third branch portion 1224 of the L-type structure in the switch element 122 of a second-type pixel unit 12b in the $m^{th}$ row of pixel units is shared with the second end of the third branch portion 1224 of the L-type structure in the switch element 122 of a first-type pixel unit 12a in the $(m+1)^{th}$ row of pixel units, the third branch portion 1224 is provided in a region between the second scanning line 112 corresponding to the $m^{th}$ row of pixel units and the first scanning 111 line corresponding to the $(m+1)^{th}$ row of pixel units; and the first end 122b of the switch element 122 of the second-type pixel unit 12b in the $m^{th}$ row of pixel units and the first end 122b of the switch element 122 of the first-type pixel unit 12a in the $(m+1)^{th}$ row of pixel units are located in the region between the second scanning line 112 corresponding to the $m^{th}$ row of pixel units and the first scanning line 111 corresponding to the $(m+1)^{th}$ row of pixel units.

When in each row of pixel units, the first-type pixel units 12a are located in even columns and the second-type pixel units 12b are located in odd columns, or the first-type pixel units 12a are located in odd columns and the second-type pixel units 12b are located in even columns, the active layer structure 122a of the switch element 122 in each pixel unit 12 is set as the L-type structure, at this time, in the same column of pixel units, first ends 122b of two switch elements 122 in two adjacent rows of pixel units are connected to different data lines 13. As shown in FIG. 9, the L-type structure includes a third branch portion 1224 and a fourth branch portion 1225. Exemplarily, the third branch portion 1224 may be disposed perpendicularly to the fourth branch portion 1225. The third branch portion 1224 of the L-type structure in the second-type pixel unit 12b in the $m^{th}$ row of pixel units and the third branch portion 1224 of the L-type structure in the first-type pixel unit 12a in the $(m+1)^{th}$ row of pixel units both are located in the region between the second scanning line 112 corresponding to the $m^{th}$ row of pixel units and the first scanning line 111 corresponding to the $(m+1)^{th}$ row of pixel units and are shared with each other, thus reducing the width of the light-shielding region between the $m^{th}$ row of pixel units and the $(m+1)^{th}$ row of pixel units. As can be seen from FIG. 9, for the active layer structure 122a of the L-type structure, the first end 122b of the second-type pixel unit 12b in the $m^{th}$ row of pixel units and the first end 122b of the first-type pixel unit 12a in the $(m+1)^{th}$ row of pixel units are located in the region between the second scanning line 112 corresponding to the $m^{th}$ row of pixel units and the first scanning line 111 corresponding to the $(m+1)^{th}$ row of pixel units. An overlapping portion between the scanning line 11 corresponding to the active layer structure 122a and the fourth branch portion 1225 of the active layer structure 122a is the control end of the switch element 122 to which the active layer structure 122a belongs.

Figure 10:
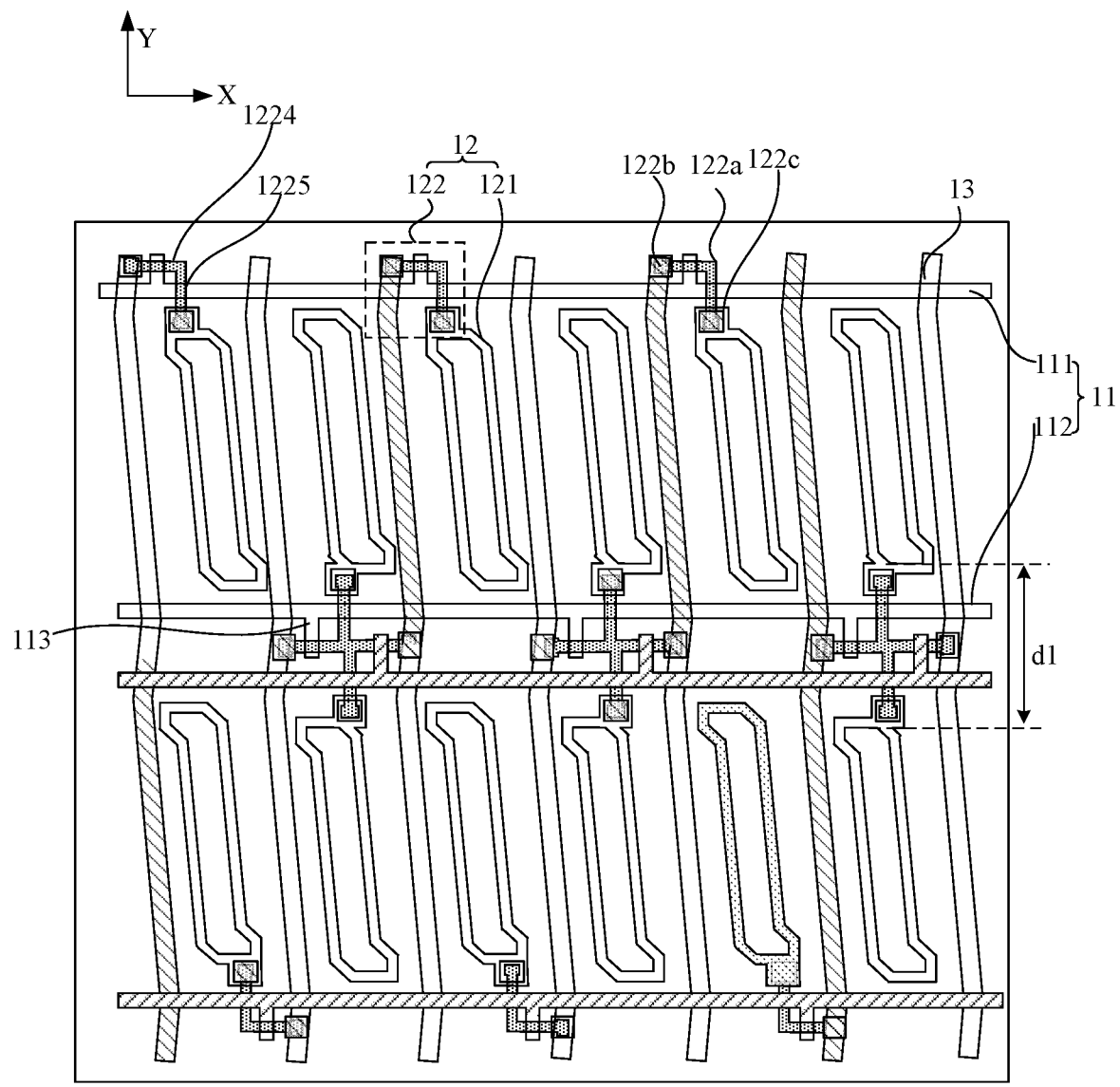
FIG. 10 is another enlarged structural view of local region A4 of the array substrate in FIG. 8.

Referring to FIG. 10, FIG. 10 is another enlarged structural view of local region A4 of the array substrate in FIG. 8. In an embodiment, the scanning lines 11 may further include multiple bump structures 113 perpendicular to the row direction X; and the multiple bump structures 113 are disposed in one-to-one correspondence with multiple pixel units 12, and an overlapping portion between each bump structure 113 and the third branch portion 1224 of the respective pixel unit 12 corresponding to the bump structure 113 is the control end of the switch element 122 to which the active layer structure 122a belongs.

On the basis of the structure of the array substrate shown in FIG. 9, each scanning line 11 of the array substrate shown in FIG. 10 is provided with a bump structure 113 in one-to-one correspondence with a pixel unit 12 connected to the scanning line 11, and the multiple bump structures 113 on the scanning lines 11 extend along the direction perpendicular to the row direction X. Each bump structure 113 has an overlapping portion with the third branch portion 1224 of a pixel unit 12 corresponding to the bump structure 113 on the plane parallel to the plane where the array substrate is located, and the overlapping portion is served as the control end of the switch element 122 to which the active layer structure 122a belongs. Therefore, each scanning line 11 can form overlapping portions with the third branch portion 1224 and the fourth branch portion 1225 of the switch elements 122 corresponding to the scanning line 11, so that the switch element 122 corresponding to the scanning line 11 forms the dual-gate structure, and the switching speed of the switch element 122 is enhanced, and the transmission efficiency of the switch elements 122 is improved.

Hereafter, the second case of the common region B1 is described in this embodiment.

With continued reference to FIG. 4 and FIG. 5, in an embodiment, multiple first-type pixel units 12a in an $n^{th}$ row of pixel units are disposed in one-to-one correspondence with multiple first-type pixel units 12a in an $(n+1)^{th}$ row of pixel units, each first-type pixel unit 12a in the $n^{th}$ row of pixel units and the respective first-type pixel unit 12a in the $(n+1)^{th}$ row of pixel units corresponding to the first-type pixel unit 12a in the $n^{th}$ row of pixel units are located in the same column, and n is an integer greater than or equal to 1. In the direction perpendicular to the row direction X, an active layer structure 122a of the switch element 122 of each second-type pixel unit 12b in the $n^{th}$ row of pixel units has an overlapping region with an active layer structure 122a of the switch element 122 of the respective first-type pixel unit 12a in the $(n+1)^{th}$ row of pixel units corresponding to each first-type pixel unit 12a, and the overlapping region is located between the second scanning line 112 corresponding to the $n^{th}$ row of pixel units and the first scanning line 111 corresponding to the $(n+1)^{th}$ row of pixel units.

In the present embodiment, in two adjacent rows of pixel units, each of multiple first-type pixel units 12a in the $n^{th}$ row of pixel units corresponds to a respective one of multiple first-type pixel units 12a in the $(n+1)^{th}$ row of pixel units, and each of the multiple first-type pixel units 12a in the $n^{th}$ row of pixel units and the respective first-type pixel unit 12a in the $(n+1)^{th}$ row of pixel units corresponding to the first-type pixel unit 12a are located in the same column. Similarly, each of multiple second-type pixel units 12b in the $n^{th}$ row of pixel units corresponds to a respective one of multiple second-type pixel units 12b in the $(n+1)^{th}$ row of pixel units, and two second-type pixel units 12b corresponding to each other are located in the same column. Each of the multiple second-type pixel units 12b in the $n^{th}$ row of pixel units and the first-type pixel unit 12a in the $(n+1)^{th}$ row of pixel units corresponding to the second-type pixel unit 12b are not located in the same column, so that one active layer structure 122a cannot be shared, and there is the overlapping region in the direction perpendicular to the row direction X, i.e., the common region B1 in FIG. 5. The above overlapping region can also reduce the width d1 of the light-shielding region between the $n^{th}$ row of pixel units and the $(n+1)^{th}$ row of pixel units, increase the pixel density of the display screen and enhance the image display effect.

With continued reference to FIG. 4 and FIG. 5, in an embodiment, the active layer structure 122a is a U-type structure, and the U-type structure includes a bottom 1221, a first branch portion 1222 disposed on a first end of the bottom 1221 and a second branch portion 1223 disposed on a second end of the bottom 1221; the first branch portion 1222 is connected to the first end 122b of the switch element 122 to which the active layer structure 122a belongs, the second branch portion 1223 is connected to the second end 122c of the switch element 122 to which the active layer structure 122a belongs, and an overlapping portion between a scanning line 11 corresponding to the active layer structure 122a and the active layer structure 122a is the control end of the switch element 122 to which the active layer structure 122a belongs. In the direction perpendicular to the row direction X, both the bottom 1221 of the active layer structure 122a of the switch element 122 of a second-type pixel unit 12b in the $n^{th}$ row of pixel units and the bottom 1221 of the active layer structure 122a of the switch element 122 of a first-type pixel unit 12a in the $(n+1)^{th}$ row of pixel units are located in the overlapping region.

Similarly, when the second-type pixel unit 12b in the $n^{th}$ row of pixel units and the respective first-type pixel unit 12a in the $(n+1)^{th}$ row of pixel units are not located in the same column, the active layer structure 122a of the switch element 122 may also be the U-type structure, and the U-type structure includes a bottom 1221, a first branch portion 1222 and a second branch portion 1223. As shown in FIG. 5, the active layer structure 122a exists in two adjacent rows of pixel units in the overlapping region, and the bottoms 1221 of the U-type structures in the two adjacent rows of pixel units are provided in a region between the second scanning line 112 corresponding to the $m^{th}$ row of pixel units and the first scanning line 111 corresponding to the $(m+1)^{th}$ row of pixel units, thus reducing the width of the light-shielding region. The first branch portion 1222 of the U-type structure crosses the scanning line 11 corresponding to the U-type structure and is connected to the first end 122b of the switch element 122 to which the U-type structure belongs, and the second branch portion 1223 of the U-type structure crosses the scanning line 11 corresponding to the U-type structure and is connected to the second end 122c of the switch element 122 to which the U-type structure belongs, so that in the plane where the array substrate is located, the active layer structure 122a has two portions overlapping with the scanning line 11 corresponding to the active layer structure 122a to form the dual-gate structure, enhancing the switch speed of the switch element 122 and improving the transmission efficiency of the switch element 122.

With continued reference to FIG. 5, in an embodiment, a distance d2 between the bottom 1221 of the U-type structure of the switch element 122 of a second-type pixel unit 12b in the $n^{th}$ row of pixel units and the first scanning line 111 corresponding to the $(n+1)^{th}$ row of pixel units is less than a distance d3 between the bottom 1221 of the U-type structure of the switch element 122 of a second-type pixel unit 12b in the $n^{th}$ row of pixel units and the second scanning line 112 corresponding to the $n^{th}$ row of pixel units; and a distance d4 between the bottom 1221 of the U-type structure of the switch element 122 of a first-type pixel unit 12a in the $(n+1)^{th}$ row of pixel units and the second scanning line 112 corresponding to the $n^{th}$ row of pixel units is less than a distance d5 between the bottom 1221 of the U-type structure of the switch element 122 of the first-type pixel unit 12a in the $(n+1)^{th}$ row of pixel units and the first scanning line 111 corresponding to the $(n+1)^{th}$ row of pixel units.

On the basis that both the bottom 1221 of the active layer structure 122a of the switch element 122 of the second-type pixel unit 12b in the $n^{th}$ row of pixel units and the bottom 1221 of the active layer structure 122a of the switch element 122 of the first-type pixel unit 12a in the $(n+1)^{th}$ row of pixel units are located in the overlapping region B1, in this embodiment, the distance d2 between the bottom 1221 of the U-type structure of the second-type pixel unit 12b in the $n^{th}$ row of pixel units and the first scanning line 111 corresponding to the $(n+1)^{th}$ row of pixel units is less than the distance d3 between the bottom 1221 of the second-type pixel unit 12b in the $n^{th}$ row of pixel units and the second scanning line 112 corresponding to the $n^{th}$ row of pixel units, that is, the bottom 1221 of the U-type structure of the second-type pixel unit 12b in the $n^{th}$ row of pixel units is closer to the first scanning line 111 corresponding to the $(n+1)^{th}$ row of pixel units; and similarly, the distance d4 between the bottom 1221 of the U-type structure of the first-type pixel unit 12a in the $(n+1)^{th}$ row of pixel units and the second scanning line 112 corresponding to the $n^{th}$ row of pixel units is less than the distance d5 between the bottom 1221 of the first-type pixel unit 12a in the $(n+1)^{th}$ row of pixel units and the first scanning line 111 corresponding to the $(n+1)^{th}$ row of pixel units, that is, the bottom 1221 of the U-type structure of the first-type pixel unit 12a in the $(n+1)^{th}$ row of pixel units is closer to the second scanning line 112 corresponding to the $n^{th}$ row of pixel units, so that the overlapping region B1 between the active layer structure 122a of the second-type pixel unit 12b in the $n^{th}$ row of pixel units and the active layer structure 122a of the first-type pixel unit 12a in the $(n+1)^{th}$ row of pixel units is relative large, thereby further reducing the distance between the second scanning line 112 corresponding to the $n^{th}$ row of pixel units and the first scanning line 111 corresponding to the $(n+1)^{th}$ row of pixel units, and facilitating the reduction in the width d1 of the light-shielding region. The distance between the above bottom 1221 and the scanning line 11 refers to a distance between the centerline of the bottom 1221 and the centerline of the scanning line 11.

Figure 11:
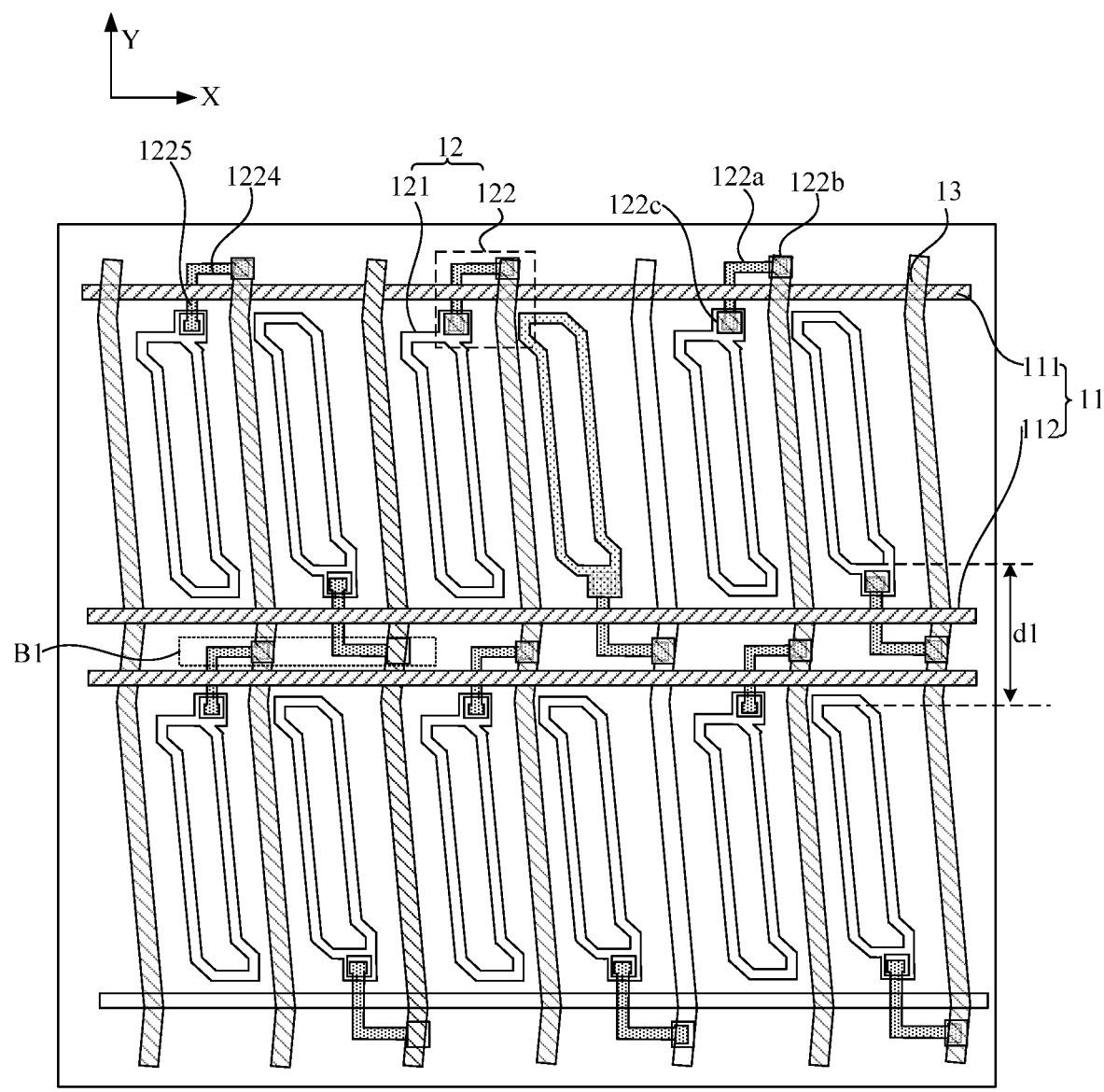
FIG. 11 is another enlarged structural view of local region A4 of the array substrate in FIG. 4.

FIG. 11 is another enlarged structural view of local area A4 of the array substrate in FIG. 4. Alternatively, the active layer structure 122a may be the L-type structure, and the L-type structure includes a third branch portion 1224 extending along the row direction X and a fourth branch portion 1225 extending along the column direction Y; a first end of the third branch portion 1224 is connected to the first end 122b of the switch element 122 to which the active layer structure 122a belongs, the second end of the third branch portion 1224 is connected to a first end of the fourth branch portion 1225, a second end of the fourth branch portion 1225 is connected to the second end 122c of the switch element 122 to which the active layer structure 122a belongs, and an overlapping portion between a scanning line 11 corresponding to the active layer structure 122a and the fourth branch portion 1225 is the control end of the switch element 122 to which the active layer structure 122a belongs. In the same column of pixel units, the third branch portion 1224 of the L-type structure of the switch element 122 of a second-type pixel unit 12b in the $n^{th}$ row of pixel units and the third branch portion 1224 of the L-type structure of the switch element 122 of a first-type pixel unit 12a in the $(n+1)^{th}$ row of pixel units are located in the overlapping region, and the third branch portion 1224 is provided in a region between the second scanning line 112 corresponding to the $n^{th}$ row of pixel units and the first scanning line 111 corresponding to the $(n+1)^{th}$ row of pixel units. Both the first end 122b of the switch element 122 of the second-type pixel unit 12b in the $n^{th}$ row of pixel units and the first end 122b of the switch element 122 of the first-type pixel unit 12a in the $(n+1)^{th}$ row of pixel units are located in the region between the second scanning line 112 corresponding to the $n^{th}$ row of pixel units and the first scanning line 111 corresponding to the $(n+1)^{th}$ row of pixel units.

When the second-type pixel unit 12b in the $n^{th}$ row of pixel units and the respective first-type pixel unit 12a in the $(n+1)^{th}$ row of pixel units are not located in the same column, the active layer structure 122a of the switch element 122 of a pixel unit 12 may also be the L-type structure. As shown in FIG. 11, the L-type structure includes the third branch portion 1224 and the fourth branch portion 1225. Exemplarily, the third branch portion 1224 may be disposed perpendicularly to the fourth branch portion 1225. Both the third branch portion 1224 of the L-type structure in the second-type pixel unit 12b in the $n^{th}$ row of pixel units and the third branch portion 1224 of the L-type structure in the first-type pixel unit 12a in the $(n+1)^{th}$ row of pixel units are located in the region between the second scanning line 112 corresponding to the $n^{th}$ row of pixel units and the first scanning line 111 corresponding to the $(n+1)^{th}$ row of pixel units, and the third branch portion 1224 of the L-type structure in the second-type pixel unit 12b in the $n^{th}$ row of pixel units has an overlapping region (i.e., the common region B1) perpendicular to the row direction X with the third branch portion 1224 of the L-type structure in the first-type pixel unit 12a in the $(n+1)^{th}$ row of pixel units, thus reducing the width of the light-shielding region between the $n^{th}$ row of pixel units and the $(n+1)^{th}$ row of pixel units. As can be seen from FIG. 11, for the active layer structure 122a of the L-type structure, the first end 122b of the second-type pixel unit 12b in the $n^{th}$ row of pixel units and the first end 122b of the first-type pixel unit 12a in the $(n+1)^{th}$ row of pixel units are located in the region between the second scanning line 112 corresponding to the $n^{th}$ row of pixel units and the first scanning line 111 corresponding to the $(n+1)^{th}$ row of pixel units. An overlapping portion between the scanning line 11 corresponding to the L-type structure and the fourth branch portion 1225 of the switch element 122 corresponding to the L-type structure is the control end of the switch element 122 corresponding to the L-type structure.

Figure 12:
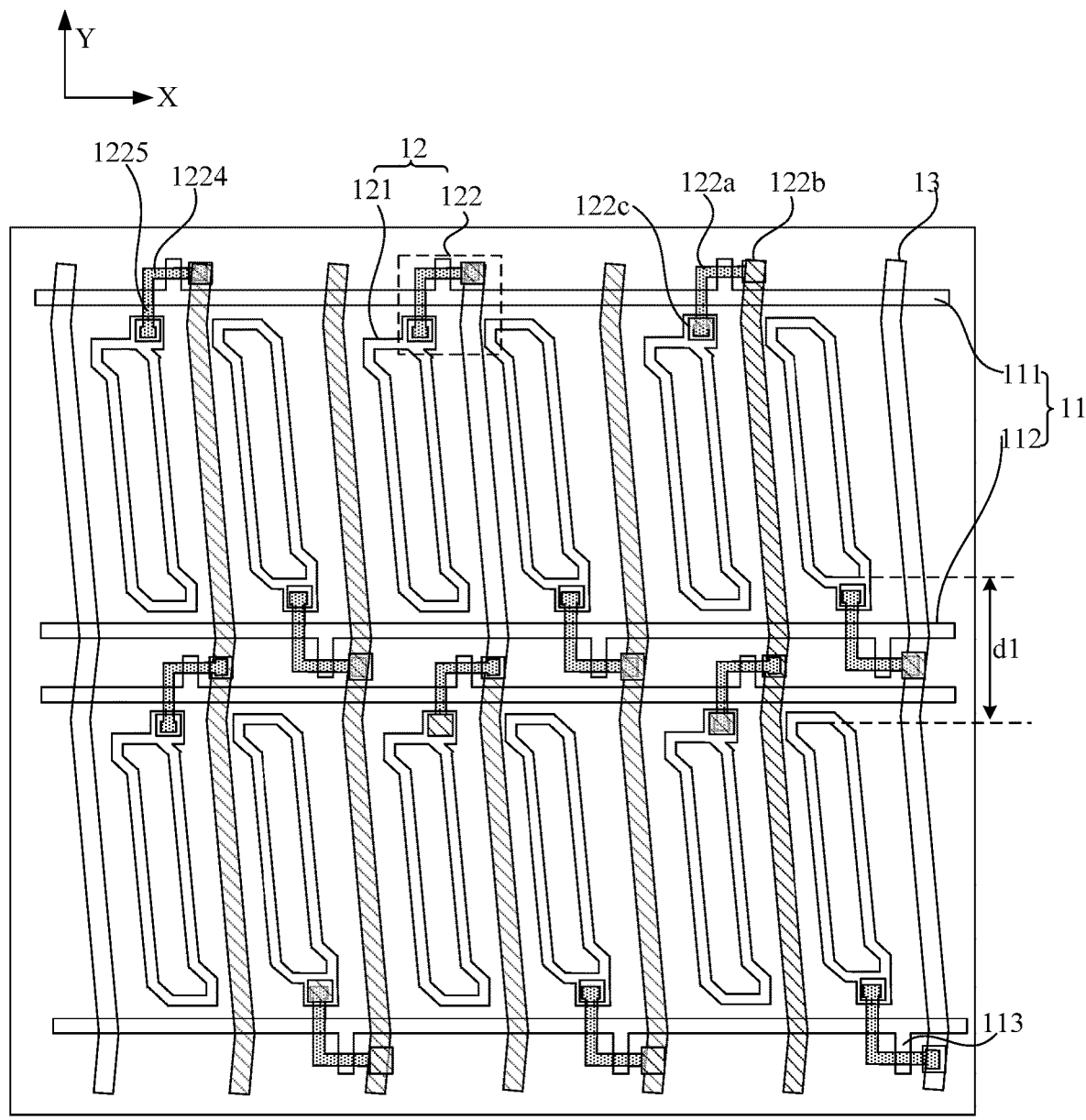
FIG. 12 is another enlarged structural view of local region A4 of the array substrate in FIG. 4.

FIG. 12 is another enlarged structural view of local area A4 of the array substrate in FIG. 4. Alternatively, the scanning lines 11 may further include multiple bump structures 113 perpendicular to the row direction X; and the multiple bump structures 113 are arranged in one-to-one correspondence with multiple pixel units 12, and an overlapping portion between each bump structure 113 and the third branch portion 1224 of the respective pixel unit 12 corresponding to the bump structure 113 is the control end of the switch element 122 to which the active layer structure 122a belongs.

On the basis of the structure of the array substrate shown in FIG. 11, the scanning lines 11 of the array substrate shown in FIG. 12 are provided with multiple bump structures 113 in one-to-one correspondence with multiple pixel units 12 connected to the scanning lines 11, and the multiple bump structures 113 on the scanning lines 11 extend along the direction perpendicular to the row direction X. Each bump structure 113 has an overlapping portion with the third branch portion 1224 of a pixel unit 12 corresponding to the bump structure 113 on the plane parallel to the plane where the array substrate is located, and the overlapping portion is the control end of the switch element 122 to which the active layer structure 122a belongs. Therefore, the scanning lines 11 can form overlapping portions respectively with the third branch portions 1224 and the fourth branch portions 1225 of the switch elements 122 corresponding to the scanning lines 11, so that the switch elements 122 corresponding to the scanning lines 11 form the dual-gate structure, the switching speed of the switch elements 122 is enhanced, and the transmission efficiency of the switch elements 122 is improved.

Figure 13:
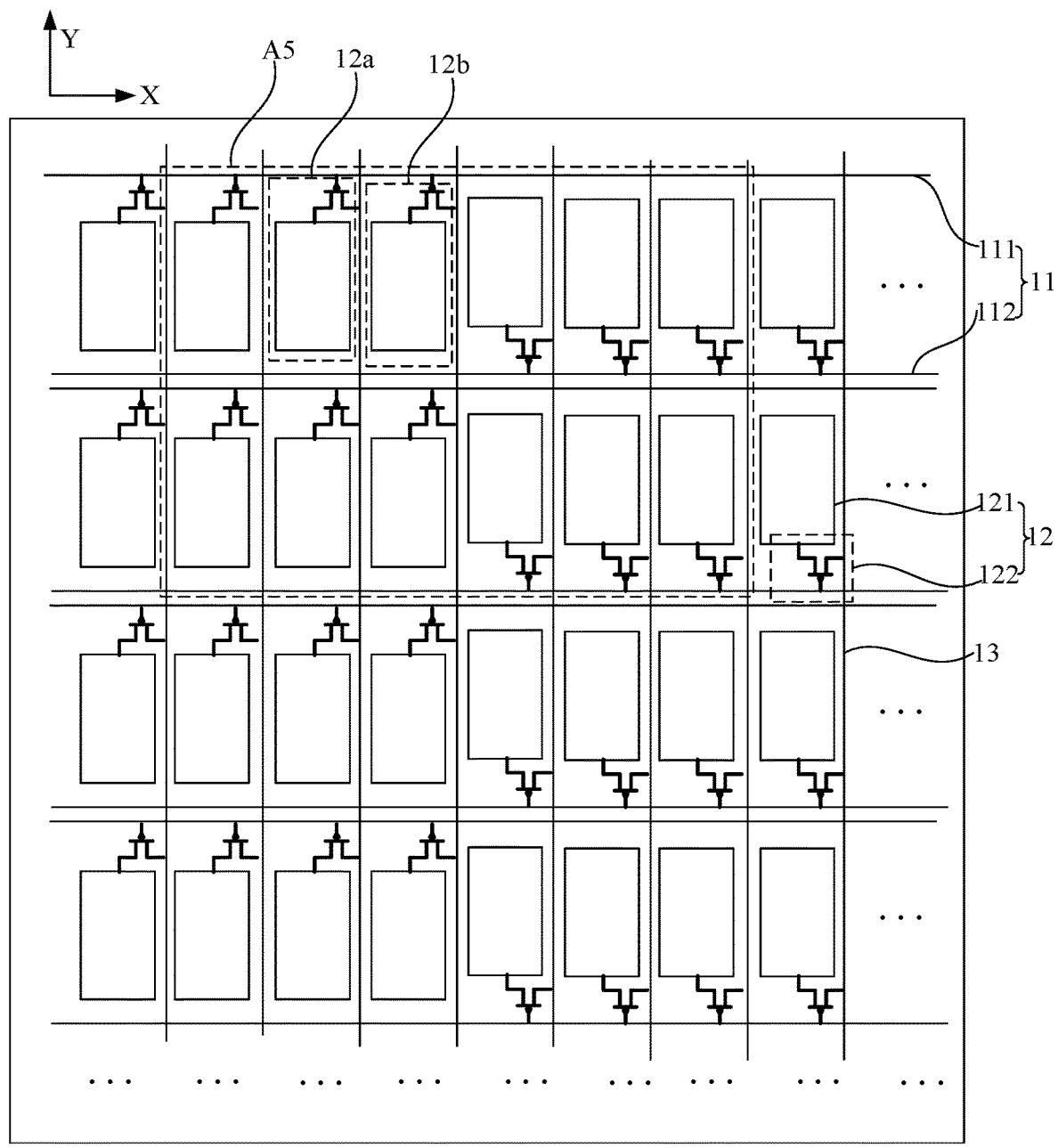
FIG. 13 is a structural diagram of another array substrate according to an embodiment of the present application.
Figure 14:
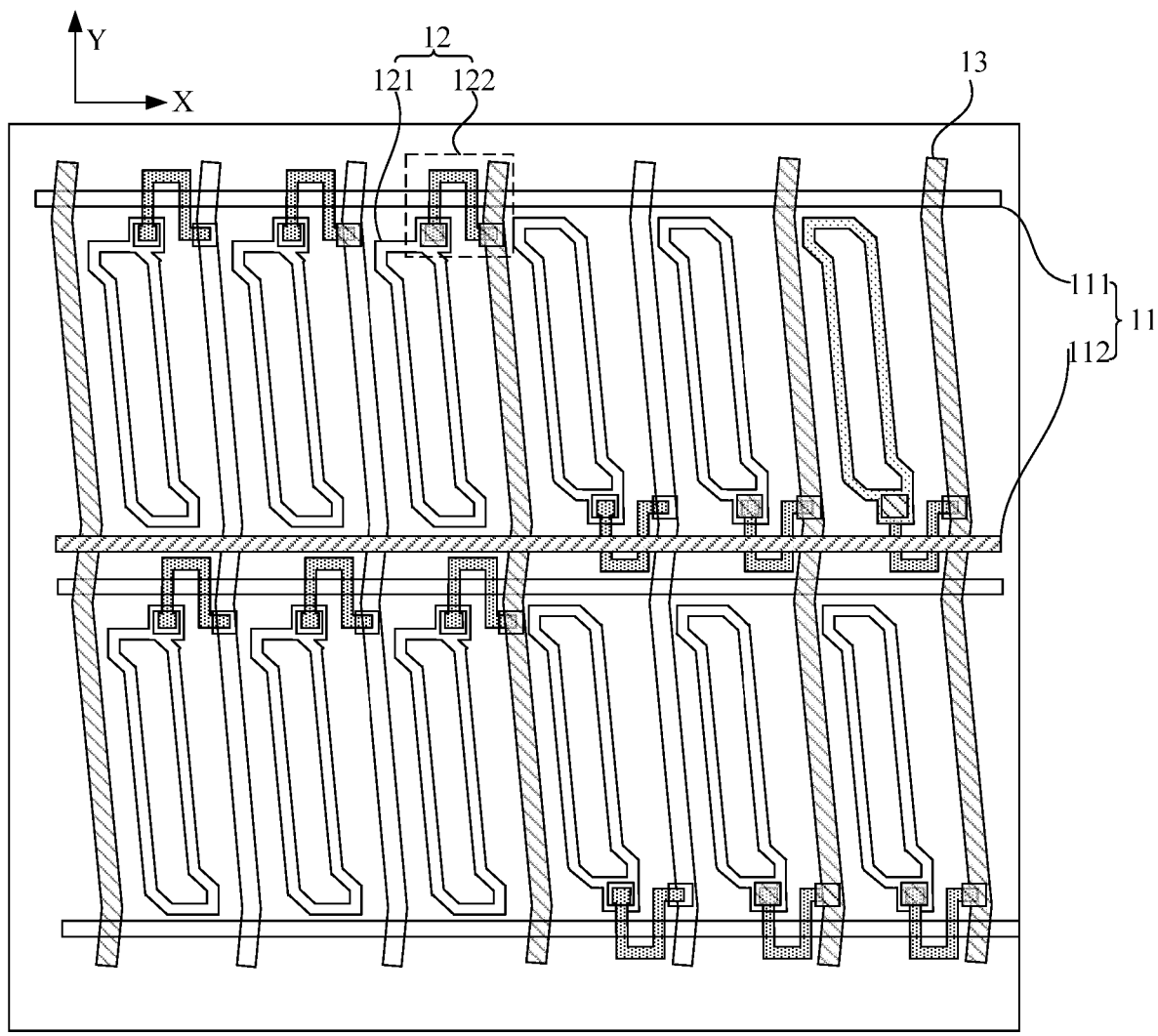
FIG. 14 is an enlarged structural view of local region A5 of the array substrate in FIG. 13.

FIG. 4 shows the case in which the first-type pixel units 12a and the second-type pixel units 12b in each row of pixel units are alternately disposed one by one. In the present embodiment, the setting of the first-type pixel units 12a and the second-type pixel units 12b in each row of pixel units may be irregular. Exemplarily, as shown in FIG. 13 and FIG. 14, FIG. 13 is a structural diagram of another array substrate according to an embodiment of the present application and FIG. 14 is an enlarged structural view of local region A4 of the array substrate in FIG. 13, the first-type pixel units 12a in each row of pixel units may be disposed at the front half and the second-type pixel units 12b in the row of pixel units may be disposed at the back half; alternatively, arranging several first-type pixel units 12a and then arranging several second-type pixel units 12b alternate in sequence. The present embodiment does not limit the set positions of the first-type pixel units 12a and the second-type pixel units 12b in each row of pixel units.

Furthermore, in the present embodiment, in order to accurately set each pixel unit 12, a certain rule may be set for the first-type pixel units 12a and the second-type pixel units 12b. With continued reference to FIG. 4, in an embodiment, in each row of pixel units, the first-type pixel units 12a are located in odd columns and the second-type pixel units 12b are located in even columns; alternatively, in each row of pixel units, the first-type pixel units 12a are located in even columns and the second-type pixel units 12b are located in odd columns. In the present embodiment, the first-type pixel units 12a and the second-type pixel units 12b in each row of pixel units are alternately disposed one by one. For example, in each row of pixel units, the first-type pixel units 12a are located in even columns and the second-type pixel units 12b are located in odd columns so that in two adjacent rows of pixel units, each second-type pixel unit 12b in the $n^{th}$ row of pixel units has an overlapping region with a respective first-type pixel unit 12a in the $(n+1)^{th}$ row of pixel units corresponding to the second-type pixel unit 12b in the direction perpendicular to the row direction X.

Figure 15:
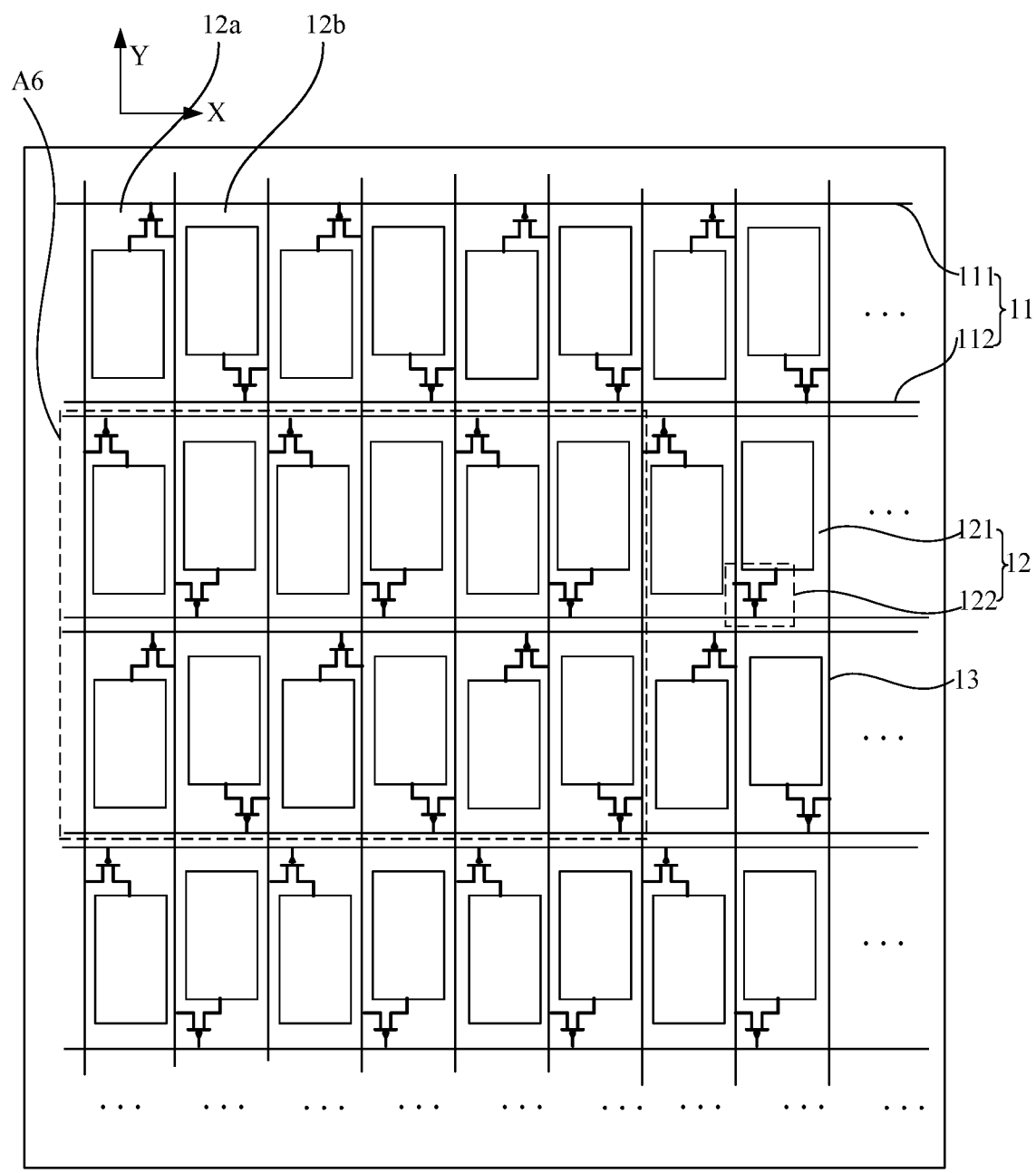
FIG. 15 is a structural diagram of another array substrate according to an embodiment of the present application.
Figure 16:
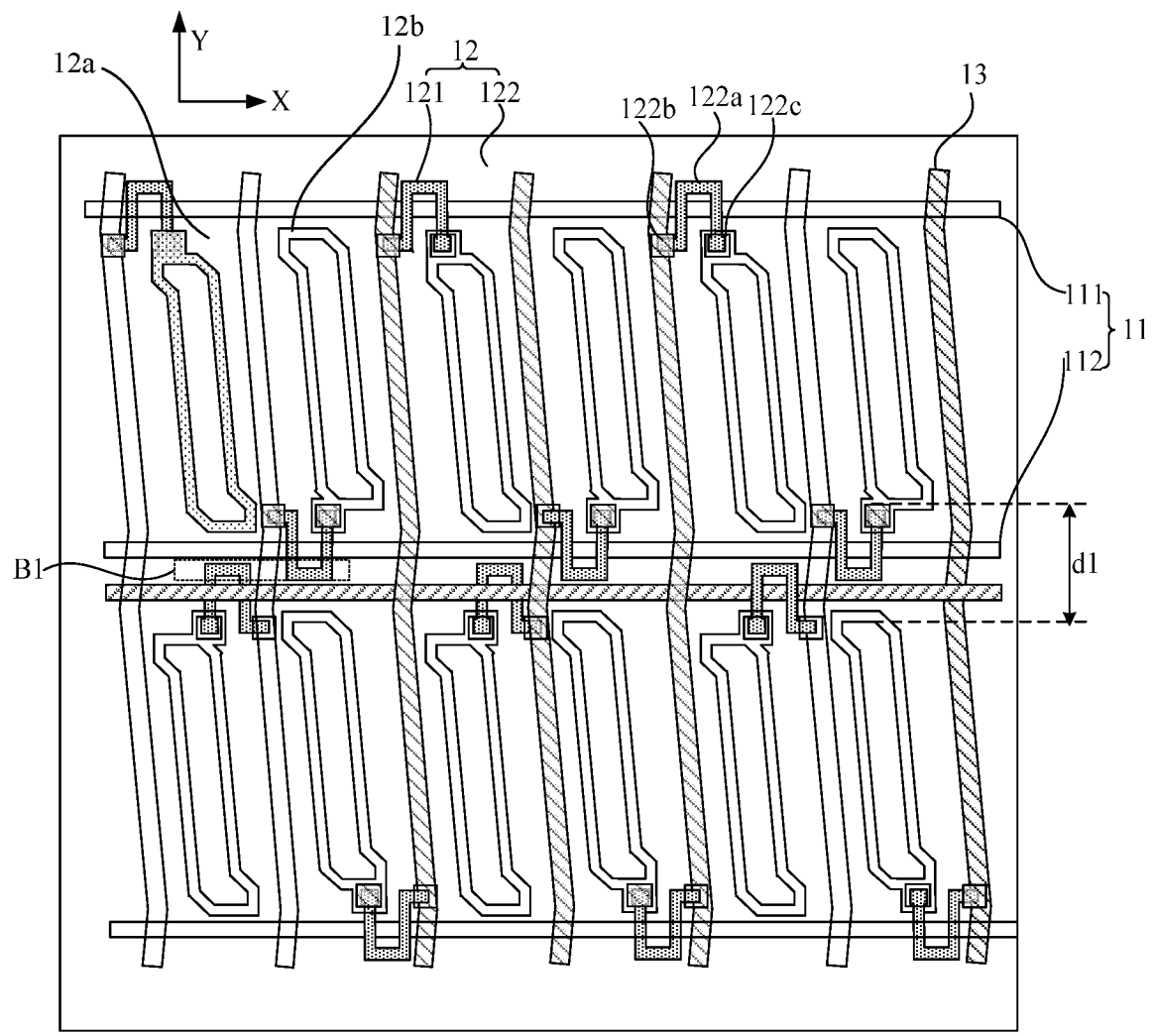
FIG. 16 is an enlarged structural view of local region A6 of the array substrate in FIG. 15.

FIG. 15 is a structural diagram of another array substrate according to an embodiment of the present application, and FIG. 16 is an enlarged structural view of local region A6 of the array substrate in FIG. 15. In an embodiment, in two adjacent rows of pixel units, the switch element 122 of a first-type pixel unit 12a in a $p^{th}$ column of pixel units of one row of the two adjacent rows of pixel units is disposed on one side close to a $(p+1)^{th}$ column of pixel units, and the switch element 122 of a second-type pixel unit 12b in the $(p+1)^{th}$ column of pixel units in the other row of the two adjacent rows of pixel units is disposed on one side close to the $p^{th}$ column of pixel units; alternatively, the switch element 122 of a second-type pixel unit 12b in a $p^{th}$ column of pixel units of one row of the two adjacent rows of pixel units is disposed on one side close to the $(p+1)^{th}$ column of pixel units, and the switch element 122 of a first-type pixel unit 12a in the $(p+1)^{th}$ column of pixel units in the other row of the two adjacent rows of pixel units is disposed on one side close to the $p^{th}$ column of pixel units, and p is an integer greater than or equal to 1. In two adjacent rows of pixel units, the switch element 122 of the first-type pixel unit 12a in the $p^{th}$ column of pixel units in one row of the two adjacent rows of pixel units and the switch element 122 of the second-type pixel unit 12b in the $(p+1)^{th}$ column of pixel units in the other row are centrally symmetrically arranged; alternatively, the switch element 122 of the second-type pixel unit 12b in the $p^{th}$ column of pixel units in one row of the two adjacent rows of pixel units and the switch element 122 of the first-type pixel unit 12a in the $(p+1)^{th}$ column of pixel units in the other row are centrally symmetrically arranged. A data line 13 connected to the first end 122b of the switch element 122 of the first-type pixel unit 12a in the $p^{th}$ column of pixel units is identical to a data line 13 connected to the first end 122b of the switch element 122 of the second-type pixel unit 12b in the $(p+1)^{th}$ column of pixel units; alternatively. a data line 13 connected to the first end 122b of the switch element 122 of the second-type pixel unit 12b in the $p^{th}$ column of pixel units is identical to a data line 13 connected to the first end 122b of the switch element 122 of the first-type pixel unit 12a in the $(p+1)^{th}$ column of pixel units.

On the basis that in each row of pixel units, first-type pixel units 12a are located in odd columns and second-type pixel units 12b are located in even columns, or first-type pixel units 12a are located in even columns and second-type pixel units 12b are located in odd columns, in two adjacent rows of pixel units, two adjacent rows of pixel units share one data line 13, and switch elements of the two pixel units 12 are disposed close to the shared data line 13. The switch element 122 of the first-type pixel unit 12a in the $p^{th}$ column of pixel units is disposed on one side close to the $(p+1)^{th}$ column of pixel units, and the switch element 122 of the second-type pixel unit 12b in the $(p+1)^{th}$ column of pixel units is disposed on one side close to the $p^{th}$ column of pixel units; alternatively, the switch element 122 of the second-type pixel unit 12b in the $p^{th}$ column of pixel units is disposed on one side close to the $(p+1)^{th}$ column of pixel units, and the switch element 122 of the first-type pixel unit 12a in the $(p+1)^{th}$ column of pixel units is disposed on one side close to the $p^{th}$ column of pixel units. Exemplarily, as shown in FIG. 15, the switch element 122 of a second-type pixel unit 12b in the first row and the second column is disposed close to the third column of pixel units, and the switch element 122 of a first-type pixel unit 12a in the second row and the third column is disposed close to the second column of pixel units. The second-type pixel unit 12b in the first row and the second column and the first-type pixel unit 12a in the second row and the third column share one data line 13, the two pixel units 12 sharing the one data line 13 include one first-type pixel unit 12a and one second-type pixel unit 12b. Referring to FIG. 16, in two adjacent rows of pixel units sharing one data line 13, the first-type pixel unit 12a and the second-type pixel unit 12b are centrally symmetrically arranged, and the switch element 122 of the first-type pixel unit 12a and the switch element 122 of the second-type pixel unit 12b are also centrally symmetrically arranged. The active layer structures 122a of the first-type pixel unit 12a and the second-type pixel unit 12b centrally symmetrically arranged have the common region B1 to reduce the width d1 of the light-shielding region between the $p^{th}$ row of pixel units and the $(p+1)^{th}$ row of pixel units.

Based on setting the common region in the active layers of the switch elements between two adjacent rows of pixel units, this embodiment of the present application respectively introduces two cases in which the common region exists, that is, the active layer structures of the switch elements of the two adjacent rows of pixel units are partially shared, and the active layer structures of the switch elements of the two adjacent rows of pixel units are staggered and there is the overlapping region in the direction perpendicular to the row direction X. The setting of the common region reduces the width of the light-shielding region between two adjacent rows of pixel units, increases the light-emitting area of the display screen, and under the same display screen area, the pixel density can be effectively improved, the screen display rate can be increased and the screen display effect can be improved.

Figure 17:
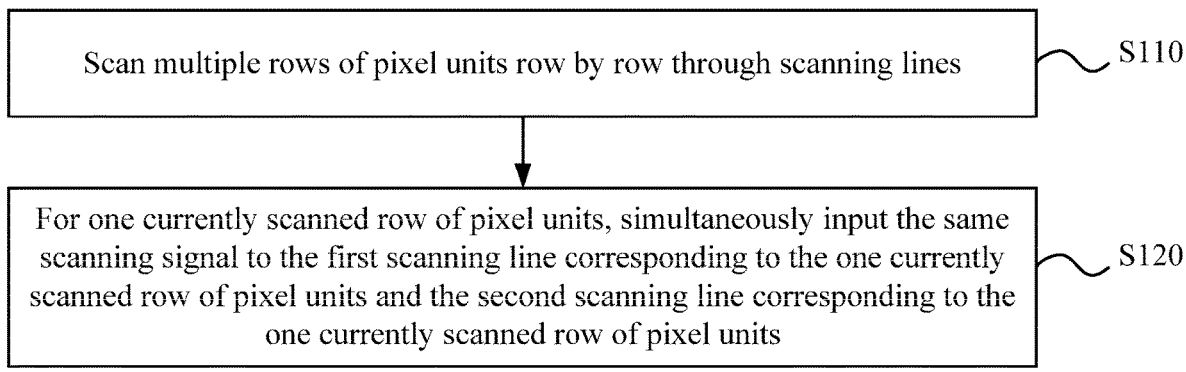
FIG. 17 is a flowchart of a driving method of an array substrate according to an embodiment of the present application.

An embodiment of the present application further provides a driving method of an array substrate. FIG. 17 is a flowchart of a driving method of an array substrate according to an embodiment of the present application. As shown in FIG. 17, the method of this embodiment includes the steps described below.

In step S110, multiple rows of pixel units are scanned row by row through scanning lines.

In the present embodiment, the pixel unit array arranged in the row direction and the column direction is disposed on the substrate, and each pixel unit in the pixel unit array includes a pixel electrode and a switch element. The substrate is further provided with scanning lines arranged in the row direction and data lines arranged in the column direction, two scanning lines are disposed between two adjacent rows of pixel units, and one data line is disposed between two adjacent columns of pixel units. A control end of the switch element is connected to a scanning line corresponding to the switch element, a first end of the switch element is connected to a data line corresponding to the switch element, and a second end of the switch element is connected to the pixel electrode of the pixel unit to which the switch element belongs. Each row of pixel units include a first side and a second side opposite to each other, the first side of each row of pixel units is provided with a first scanning line corresponding to the row of pixel units, and the first scanning line corresponding to each row of pixel units is connected to switch elements of first-type pixel units in the row of pixel units; and the second side of each row of pixel units is provided with a second scanning line corresponding to the row of pixel units, and the second scanning line corresponding to each row of pixel units is connected to switch elements of second-type pixel units in the row of pixel units. The switch elements of the first-type pixel units in each row of pixel units are disposed on one side close to the first scanning line corresponding to the row of pixel units, and the switch elements of the second-type pixel units in each row of pixel units are disposed on one side close to the second scanning line corresponding to the row of pixel units. In a direction perpendicular to the row direction, an active layer structure of the switch element of a second-type pixel unit in an $i^{th}$ row of pixel units has a common region with an active layer structure of the switch element of a first-type pixel unit in an $(i+1)^{th}$ row of pixel units, and the common region is located between the second scanning line corresponding to the $i^{th}$ row of pixel units and the first scanning line corresponding to the $(i+1)^{th}$ row of pixel units, and i is an integer greater than or equal to 1.

In step S120, for one currently scanned row of pixel units, the same scanning signal is inputted to the first scanning line corresponding to the one currently scanned row of pixel units and the second scanning line corresponding to the one currently scanned row of pixel units.

The first scanning line and the second scanning line simultaneously scan the current row of pixel units so that the load capacitance quantity and capacitance magnitude of each scanning line are reduced, thereby effectively reducing the scanning power consumption. In addition, the active layer structure of the switch element in the $i^{th}$ row of pixel units has a common region with the active layer structure of the switch element in the $(i+1)^{th}$ row of pixel units. Compared with the substrate structure without setting the common region, a relatively large area is saved in the light-shielding region, being conducive to the enhancement of the pixel density of the display screen and the enhancement of the display definition.

In the embodiments of the present application, the array substrate includes pixel units arranged in an array, and further includes the scanning lines arranged along the row direction and the data lines arranged along the column direction. Two scanning lines are disposed between two adjacent rows of pixel units, and one data line is disposed between two adjacent columns of pixel units. Each row of pixel units corresponds to two scanning lines, and the two scanning lines may scan the row of pixel units simultaneously. The first side of each row of pixel units is provided with the first scanning line corresponding to the row of pixel units, and the first scanning line corresponding to each row of pixel units is connected to first-type pixel units in the row of pixel units. The switch elements of the first-type pixel units are disposed on one side close to the first scanning line. The second side opposite to the first side is provided with the second scanning line corresponding to each row of pixel units, and the second scanning line corresponding to each row of pixel units is connected to second-type pixel units in the row of pixel units. Similarly, the switch elements of the second-type pixel units are disposed on one side close to the second scanning line. In this manner, in two adjacent rows of pixel units, an active layer structure of the switch element of a second-type pixel unit in the first row of the two adjacent rows of pixel units has a common region with an active layer structure of the switch element of a first-type pixel unit in the second row, and the common region is located between the second scanning line corresponding to the first row and the first scanning line corresponding to the second row, that is, the above common region is located in the light-shielding region between two adjacent rows of pixel units. The common region can effectively reduce the set width of the light-shielding region, thereby reducing an area of the light-shielding region and increasing the light-emitting area of the display screen. Under the same display screen area, the pixel density can be effectively improved, the screen display rate can be increased, and the image display effect can be improved.

On the basis of the above embodiments, as shown in FIG. 15 and FIG. 16, in each row of pixel units, the first-type pixel units 12a are located in odd columns, and the second-type pixel units 12b are located in even columns; alternatively, in each row of pixel units, the first-type pixel units 12a are located in even columns, and the second-type pixel units 12b are located in odd columns. In two adjacent rows of pixel units, the switch element 122 of a first-type pixel unit 12a in a $p^{th}$ column of pixel units in one row of the two adjacent rows of pixel units and the switch element 122 of a second-type pixel unit 12b in a $(p+1)^{th}$ column of pixel units in the other row are centrally symmetrically arranged; alternatively, the switch element 122 of a second-type pixel unit 12b in the $p^{th}$ column of pixel units in one row of the two adjacent rows of pixel units and the switch element 122 of a first-type pixel unit 12a in the $(p+1)^{th}$ column of pixel units in the other row are centrally symmetrically arranged. A data line 13 connected to the first end 122b of the switch element 122 of the first-type pixel unit 12a in the $p^{th}$ column of pixel units is the same as a data line connected to the first end 122b of the switch element 122 of the second-type pixel unit 12b in the $(p+1)^{th}$ column of pixel units; alternatively, a data line 13 connected to the first end 122b of the switch element 122 of the second-type pixel unit 12b in the $p^{th}$ column of pixel units is the same as a data line connected to the first end 122b of the switch element 122 of the first-type pixel unit 12a in the $(p+1)^{th}$ column of pixel units; and p is an integer greater than or equal to 1.

Figure 18:
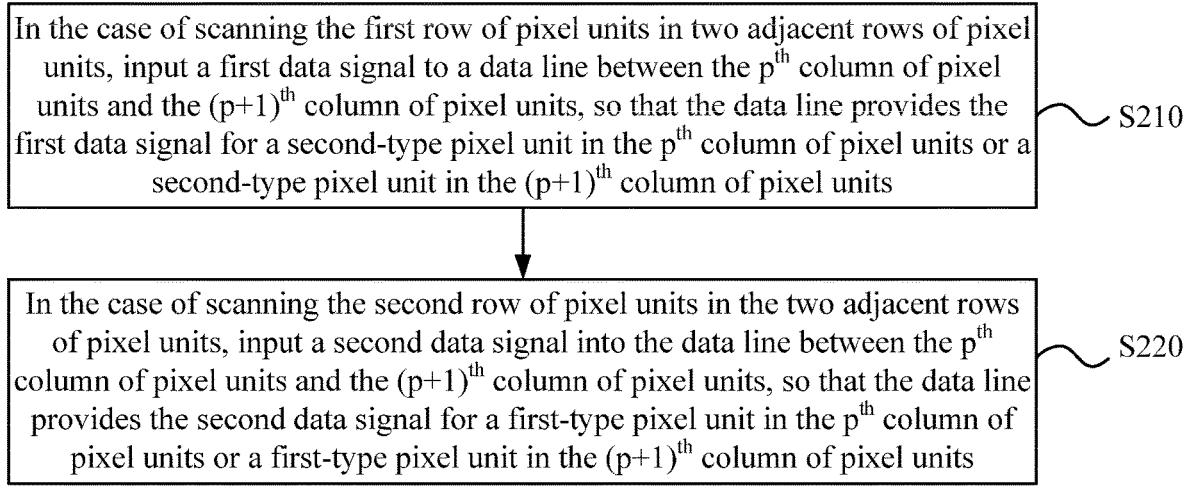
FIG. 18 is a flowchart of another driving method of an array substrate according to an embodiment of the present application.

As shown in FIG. 18, FIG. 18 is a flowchart of another driving method of an array substrate according to an embodiment of the present application. The driving method of the array substrate includes the steps described below.

In step S210, in the case of scanning the first row of pixel units in two adjacent rows of pixel units, a first data signal is inputted to a data line between the $p^{th}$ column of pixel units and the $(p+1)^{th}$ column of pixel units, so that the data line provides the first data signal for a second-type pixel unit in the $p^{th}$ column of pixel units or a second-type pixel unit in the $(p+1)^{th}$ column of pixel units.

In step S220, in the case of scanning the second row of pixel units in the two adjacent rows of pixel units, a second data signal is inputted to the data line between the $p^{th}$ column of pixel units and the $(p+1)^{th}$ column of pixel units, so that the data line provides the second data signal for a first-type pixel unit in the $p^{th}$ column of pixel units or a first-type pixel unit in the $(p+1)^{th}$ column of pixel units.

When two adjacent columns of pixel units share one data line, a driver circuit inputs the data signals to the two columns of pixel units in a time-sharing manner. When the scanning line scans a preceding one row in two adjacent rows of pixel units, the driver circuit inputs a first data signal to the data line between the $p^{th}$ column of pixel units and the $(p+1)^{th}$ column of pixel units, so that the preceding one row of pixel units emit light based on the first data signal; similarly, when the scanning line scans the next row in the two adjacent rows of pixel units, the driver circuit inputs a second data signal to the data line between the $p^{th}$ column of pixel units and the $(p+1)^{th}$ column of pixel units, so that the next row of pixel units emit light based on the second data signal. In this embodiment, the active layer structure between two rows of pixel units is provided with a common region, which can effectively reduce the set width of the light-shielding region, thereby reducing the area of the light-shielding region and increasing the light-emitting area of the display screen.

Figure 19:
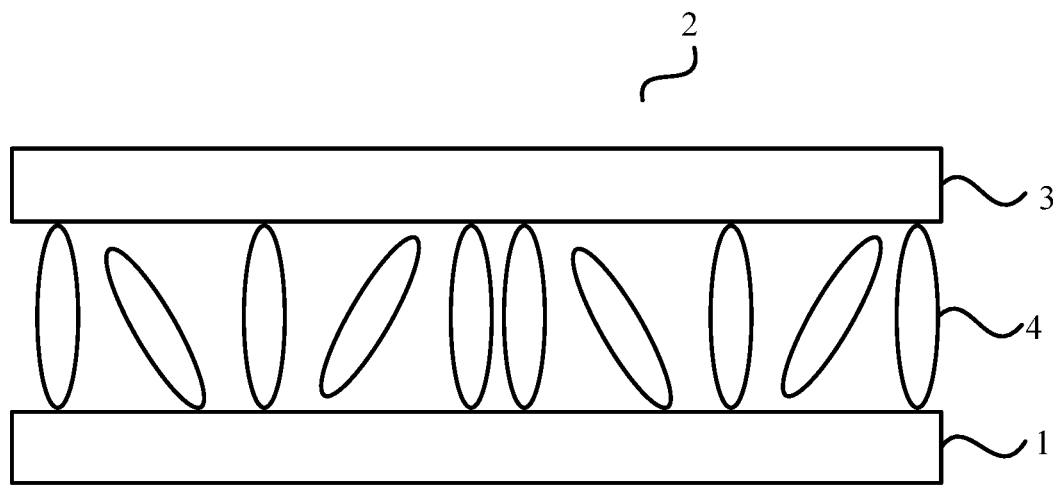
FIG. 19 is a structural diagram of a display panel according to an embodiment of the present application.

FIG. 19 is a structural diagram of a display panel according to an embodiment of the present application. As shown in FIG. 19, the embodiment of the present application further provides a display panel 2 including the array substrate 1 provided in any embodiment of the present application. The display panel 2 includes all technical features of the array substrate 1 provided in any embodiment of the present application.

Alternatively, with continued reference to FIG. 19, the display panel 2 may further include an opposite substrate 3 disposed oppositely to the array substrate 1 and a liquid crystal layer 4 located between the array substrate 1 and the opposite substrate 3. In this embodiment, the display panel may be a liquid crystal display panel, and pixel units arranged in an array on the array substrate 1 may control inversion states of liquid crystal molecules in the liquid crystal layer 4 to perform the image display. In addition, the above display panel may also be an organic light emitting display panel or the like, which is not limited to the present embodiment.

Figure 20:
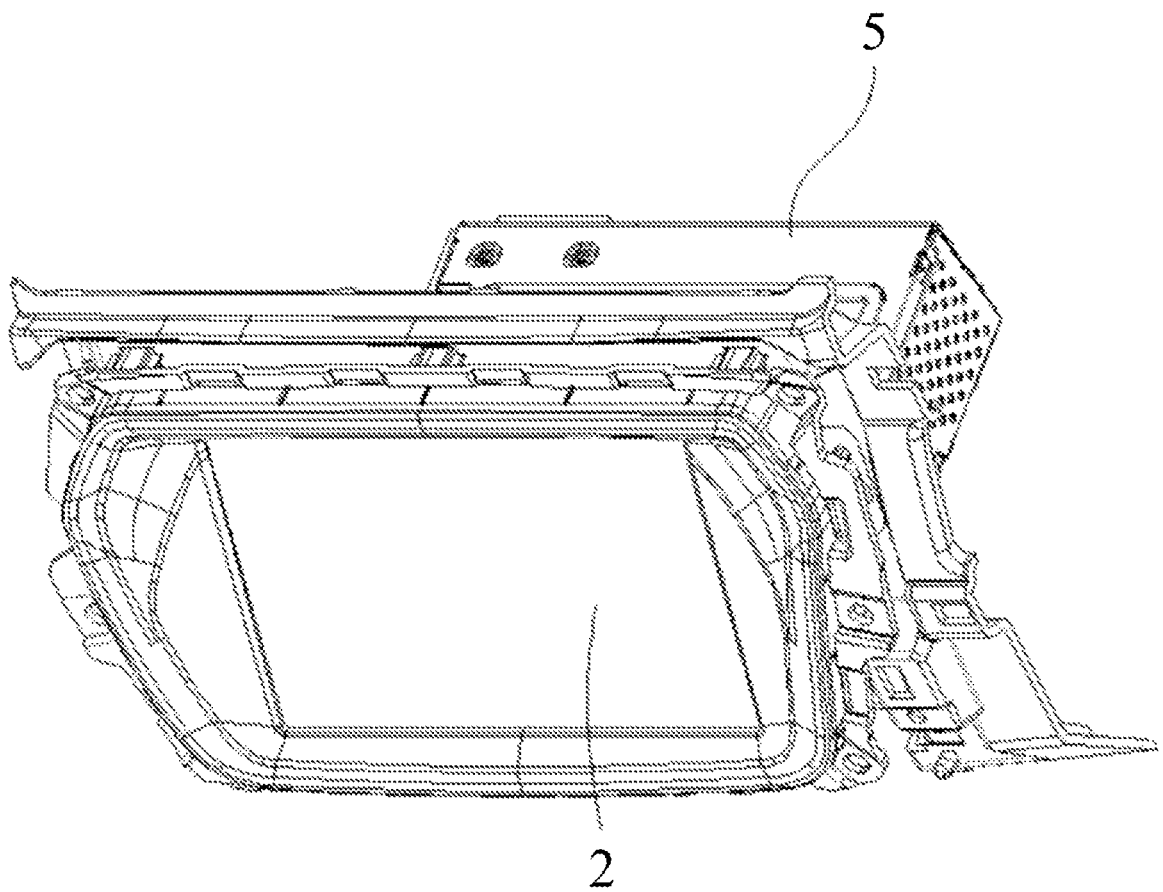
FIG. 20 is a structure diagram of a display device according to an embodiment of the present application.

FIG. 20 is a structural diagram of a display device according to an embodiment of the present application. As shown in FIG. 20, the display device 5 provided in the embodiments of the present application includes the display panel 2 of any embodiment of the present application. In an embodiment, the display device 5 is a vehicle-mounted display device shown in FIG. 20, so as to achieve the vehicle-mounted display device with a higher screen display rate and facilitate the achievement of a larger vehicle-mounted display screen. In addition, the display device may be a mobile phone, a computer, a television, a smart wearable device or the like, which is not limited to the present embodiment.

What is claimed is:

1. An array substrate, comprising:
a substrate;
and a pixel unit array disposed on the substrate, wherein each pixel unit in the pixel unit array comprises a pixel electrode and a switch element; and
scanning lines arranged in a row direction and data lines arranged in a column direction, two of the scanning lines are disposed between two adjacent rows of pixel units, and one of the data lines is disposed between two adjacent columns of pixel units; a control end of the switch element is connected to one of the scanning lines corresponding to the switch element, a first end of the switch element is connected to one of the data lines corresponding to the switch element, and a second end of the switch element is connected to the pixel electrode of a pixel unit to which the switch element belongs;
wherein each row of pixel units comprise a first side and a second side opposite to each other, the first side of each row of pixel units is provided with a first scanning line corresponding to the each row of pixel units, and the first scanning line corresponding to each row of pixel units is connected to switch elements of first-type pixel units in the each row of pixel units; and the second side of each row of pixel units is provided with a second scanning line corresponding to the each row of pixel units, and the second scanning line corresponding to each row of pixel units is connected to switch elements of second-type pixel units in the each row of pixel units; wherein the switch elements of the first-type pixel units in each row of pixel units are disposed on one side of the each row of pixel units close to the first scanning line corresponding to the each row of pixel units, and the switch elements of the second-type pixel units in each row of pixel units are disposed on one side of the each row of pixel units close to the second scanning line corresponding to the each row of pixel units; and
wherein in a direction perpendicular to the row direction, an active layer structure of a switch element of a second-type pixel unit in an $i^{th}$ row of pixel units has a common region with an active layer structure of a switch element of a first-type pixel unit in an $(i+1)^{th}$ row of pixel units, and the common region is located between the second scanning line corresponding to the $i^{th}$ row of pixel units and the first scanning line corresponding to the $(i+1)^{th}$ row of pixel units, wherein i is an integer greater than or equal to 1.

2. The array substrate of claim 1,
wherein a scanning timing of the first scanning line corresponding to each row of pixel units is the same as a scanning timing of the second scanning line corresponding to the each row of pixel units.

3. The array substrate of claim 1, wherein
a plurality of second-type pixel units in an $m^{th}$ row of pixel units are disposed in one-to-one correspondence with a plurality of first-type pixel units in an $(m+1)^{th}$ row of pixel units, and each of the plurality of second-type pixel units in the $m^{th}$ row of pixel units and the respective first-type pixel unit in the $(m+1)^{th}$ row of pixel units corresponding to the each of the plurality of second-type pixel units in the $m^{th}$ row of pixel units are located in a same column, wherein m is an integer greater than or equal to 1; and
in a same column of pixel units, an active layer structure of a switch element of a second-type pixel unit in the $m^{th}$ row of pixel units has a common portion with an active layer structure of a switch element of a first-type pixel unit in the $(m+1)^{th}$ row of pixel units.

4. The array substrate of claim 3, wherein the active layer structure is a U-type structure, the U-type structure comprises a bottom, a first branch portion disposed on a first end of the bottom and a second branch portion disposed on a second end of the bottom; the first branch portion is connected to the first end of the switch element to which the active layer structure belongs, the second branch portion is connected to the second end of the switch element to which the active layer structure belongs, and an overlapping portion between a scanning line corresponding to the active layer structure and the active layer structure is the control end of the switch element to which the active layer structure belongs; and
in a same column of pixel units, the bottom of the U-type structure of the switch element of a second-type pixel unit in the $m^{th}$ row of pixel units is shared with the bottom of the U-type structure of the switch element of a first-type pixel unit in the $(m+1)^{th}$ row of pixel units, and the shared bottom is provided in a region between the second scanning line corresponding to the $m^{th}$ row of pixel units and the first scanning line corresponding to the $(m+1)^{th}$ row of pixel units.

5. The array substrate of claim 3,
wherein in the $m^{th}$ row of pixel units, first-type pixel units are located in even columns, and second-type pixel units are located in odd columns; and in the $(m+1)^{th}$ row of pixel units, first-type pixel units are located in odd columns, and second-type pixel units are located in even columns.

6. The array substrate of claim 5, wherein in a same column of pixel units, first ends of two switch elements in two adjacent rows of pixel units are connected to different data lines;
wherein the active layer structure is an L-type structure, and the L-type structure comprises a third branch portion extending along the row direction and a fourth branch portion extending along the column direction; a first end of the third branch portion is connected to the first end of the switch element to which the active layer structure belongs, a second end of the third branch portion is connected to a first end of the fourth branch portion, a second end of the fourth branch portion is connected to the second end of the switch element to which the active layer structure belongs, and an overlapping portion between a scanning line corresponding to the active layer structure and the fourth branch portion is the control end of the switch element to which the active layer structure belongs;
wherein in a same column of pixel units, the second end of the third branch portion of the L-type structure in the switch element of a second-type pixel unit in the $m^{th}$ row of pixel units is shared with the second end of the third branch portion of the L-type structure in the switch element of a first-type pixel unit in the $(m+1)^{th}$ row of pixel units, and in a same column of pixel units, the third branch portion of the L-type structure in the switch element of the second-type pixel unit in the $m^{th}$ row of pixel units and the third branch portion of the L-type structure in the switch element of the first-type pixel unit in the $(m+1)^{th}$ row of pixel units both are provided in a region between the second scanning line corresponding to the $m^{th}$ row of pixel units and the first scanning line corresponding to the $(m+1)^{th}$ row of pixel units; and
first ends of switch elements of the second-type pixel units in the $m^{th}$ row of pixel units and first ends of switch elements of the first-type pixel units in the $(m+1)^{th}$ row of pixel units are located in the region between the second scanning line corresponding to the $m^{th}$ row of pixel units and the first scanning line corresponding to the $(m+1)^{th}$ row of pixel units.

7. The array substrate of claim 6, wherein the scanning lines are provided with a plurality of bump structures, and each bump structure of the plurality of bump structures is perpendicular to the row direction; and
wherein the plurality of bump structures are disposed in one-to-one correspondence with a plurality of pixel units, and an overlapping portion between each bump structure and the third branch portion of the respective pixel unit corresponding to the each bump structure is the control end of the switch element to which the active layer structure belongs.

8. The array substrate of claim 1, wherein a plurality of first-type pixel units in an $n^{th}$ row of pixel units are disposed in one-to-one correspondence with a plurality of first-type pixel units in an $(n+1)^{th}$ row of pixel units, each of the plurality of first-type pixel units in the $n^{th}$ row of pixel units and the respective first-type pixel unit in the $(n+1)^{th}$ row of pixel units corresponding to the each of the plurality of first-type pixel units in the $n^{th}$ row of pixel units are located in a same column, and n is an integer greater than or equal to 1; and wherein in the direction perpendicular to the row direction, an active layer structure of a switch element of a second-type pixel unit in the $n^{th}$ row of pixel units has an overlapping region with an active layer structure of a switch element of a first-type pixel unit in the $(n+1)^{th}$ row of pixel units, and the overlapping region is located between the second scanning line corresponding to the $n^{th}$ row of pixel units and the first scanning line corresponding to the $(n+1)^{th}$ row of pixel units.

9. The array substrate of claim 8, wherein the active layer structure is a U-type structure, and the U-type structure comprises a bottom, a first branch portion disposed on a first end of the bottom and a second branch portion disposed on a second end of the bottom;
the first branch portion is connected to the first end of the switch element to which the active layer structure belongs, the second branch portion is connected to the second end of the switch element to which the active layer structure belongs, and an overlapping portion between a scanning line corresponding to the active layer structure and the active layer structure is the control end of the switch element to which the active layer structure belongs; and
wherein in the direction perpendicular to the row direction, both the bottom of the active layer structure of the switch element of the second-type pixel unit in the $n^{th}$ row of pixel units and the bottom of the active layer structure of the switch element of the first-type pixel unit in the $(n+1)^{th}$ row of pixel units are located in the overlapping region.

10. The array substrate of claim 9, wherein
a distance between the bottom of the U-type structure of the switch element of the second-type pixel unit in the $n^{th}$ row of pixel units and the first scanning line corresponding to the $(n+1)^{th}$ row of pixel units is less than a distance between the bottom of the U-type structure of the switch element of the second-type pixel unit in the $n^{th}$ row of pixel units and the second scanning line corresponding to the $n^{th}$ row of pixel units; and
a distance between the bottom of the U-type structure of the switch element of the first-type pixel unit in the $(n+1)^{th}$ row of pixel units and the second scanning line corresponding to the $n^{th}$ row of pixel units is less than a distance between the bottom of the U-type structure of the switch element of the first-type pixel unit in the $(n+1)^{th}$ row of pixel units and the first scanning line corresponding to the $(n+1)^{th}$ row of pixel units.

11. The array substrate of claim 8, wherein the active layer structure is an L-type structure, and the L-type structure comprises a third branch portion extending along the row direction and a fourth branch portion extending along the column direction; a first end of the third branch portion of the active layer structure is connected to the first end of the switch element to which the active layer structure belongs, a second end of the third branch portion is connected to a first end of the fourth branch portion, a second end of the fourth branch portion is connected to the second end of the switch element to which the active layer structure belongs, and an overlapping portion between a scanning line corresponding to the active layer structure and the fourth branch portion is the control end of the switch element to which the active layer structure belongs;
wherein in a same column of pixel units, the third branch portion of the L-type structure of the switch element of the second-type pixel unit in the $n^{th}$ row of pixel units and the third branch portion of the L-type structure of the switch element of the first-type pixel unit in the (n+1)$^{th}$ row of pixel units are located in the overlapping region, and the third branch portion of the L-type structure of the switch element of the second-type pixel unit in the n$^{th}$ row of pixel units and the third branch portion of the L-type structure of the switch element of the first-type pixel unit in the (n+1)$^{th}$ row of pixel units are provided in the region between the second scanning line corresponding to the n$^{th}$ row of pixel units and the first scanning line corresponding to the (n+1)$^{th}$ row of pixel units; and wherein both the first end of the switch element of the second-type pixel unit in the n$^{th}$ row of pixel units and the first end of the switch element of the first-type pixel unit in the (n+1)$^{th}$ row of pixel units are located in the region between the second scanning line corresponding to the n$^{th}$ row of pixel units and the first scanning line corresponding to the (n+1)$^{th}$ row of pixel units.

12. The array substrate of claim 11, wherein the scanning lines are provided with a plurality of bump structures, and each bump structure of the plurality of bump structures is perpendicular to the row direction; and wherein the plurality of bump structures are disposed in one-to-one correspondence with a plurality of pixel units, and an overlapping portion between each bump structure and the third branch portion of the respective pixel unit corresponding to the each bump structure is the control end of the switch element to which the active layer structure belongs.

13. The array substrate of claim 8, wherein in each row of pixel units, first-type pixel units are located in odd columns, and second-type pixel units are located in even columns; or in each row of pixel units, first-type pixel units are located in even columns, and second-type pixel units are located in odd columns.

14. The array substrate of claim 13, wherein in two adjacent rows of pixel units, the switch element of a first target pixel unit in a p$^{th}$ column of pixel units and one row of the two adjacent rows of pixel units is disposed on one side close to a (p+1)$^{th}$ column of pixel units, the switch element of a second target pixel unit in the (p+1)$^{th}$ column of pixel units and the other row of the two adjacent rows of pixel units is disposed on one side close to the p$^{th}$ column of pixel units, and p is an integer greater than or equal to 1;

wherein in two adjacent rows of pixel units, the switch element of the first target pixel unit in the p$^{th}$ column of pixel units and the one row of the two adjacent rows of pixel units and the switch element of the second target pixel unit in the (p+1)$^{th}$ column of pixel units and the other row of the two adjacent rows of pixel units are centrally symmetrically arranged; a data line connected to the first end of the switch element of the first target pixel unit in the p$^{th}$ column of pixel units is identical to a data line connected to the first end of the switch element of the second target pixel unit in the (p+1)$^{th}$ column of pixel units; and wherein the first target pixel unit is a first-type pixel unit, and the second target pixel unit is a second-type pixel unit; or the first target pixel unit is a second-type pixel unit, and the second target pixel unit is a first-type pixel unit.

15. A driving method of an array substrate, the method being applied to the array substrate of any one of claim 1 and comprising:

scanning a plurality of rows of pixel units row by row through scanning lines; and for one currently scanned row of the plurality of rows of pixel units, inputting a same scanning signal to the first scanning line corresponding to the one currently scanned row of pixel units and the second scanning line corresponding to the one currently scanned row of pixel units.

16. The driving method of claim 15, wherein in each row of pixel units, first-type pixel units are located in odd columns, and second-type pixel units are located in even columns; or in each row of pixel units, first-type pixel units are located in even columns, and second-type pixel units are located in odd columns; in two adjacent rows of pixel units, the switch element of a first target pixel unit in a p$^{th}$ column of pixel units and one row of the two adjacent rows of pixel units and the switch element of a second target pixel unit in a (p+1)$^{th}$ column of pixel units and the other row of the two adjacent rows of pixel units are centrally symmetrically arranged; a data line connected to the first end of the switch element of the first target pixel unit in the p$^{th}$ column of pixel units is identical to a data line connected to the first end of the switch element of the second target pixel unit in the (p+1)$^{th}$ column of pixel units, and p is an integer greater than or equal to 1; wherein the first target pixel unit is a first-type pixel unit, and the second target pixel unit is a second-type pixel unit; or the first target pixel unit is a second-type pixel unit, and the second target pixel unit is a first-type pixel unit;

wherein the driving method of the array substrate further comprises:

in a case of scanning a first row of pixel units in the two adjacent rows of pixel units, inputting a first data signal to a data line between the p$^{th}$ column of pixel units and the (p+1)$^{th}$ column of pixel units, and enabling the data line to provide the first data signal for a second-type pixel unit in the p$^{th}$ column of pixel units or a second-type pixel unit in the (p+1)$^{th}$ column of pixel units; and in a case of scanning a second row of pixel units in the two adjacent rows of pixel units, inputting a second data signal to the data line between the p$^{th}$ column of pixel units and the (p+1)$^{th}$ column of pixel units, and enabling the data line to provide the second data signal for a first-type pixel unit in the p$^{th}$ column of pixel units or a first-type pixel unit in the (p+1)$^{th}$ column of pixel units.

17. A display panel, comprising an array substrate, wherein the array substrate comprises a substrate and a pixel unit array disposed on the substrate, and each pixel unit in the pixel unit array comprises a pixel electrode and a switch element;

wherein the substrate is further provided with scanning lines arranged in a row direction and data lines arranged in a column direction, two of the scanning lines are disposed between two adjacent rows of pixel units, and one of the data lines is disposed between two adjacent columns of pixel units; a control end of the switch element is connected to one of the scanning lines corresponding to the switch element, a first end of the switch element is connected to one of the data lines corresponding to the switch element, and a second end of the switch element is connected to the pixel electrode of a pixel unit to which the switch element belongs;

wherein each row of pixel units comprise a first side and a second side opposite to each other, the first side of each row of pixel units is provided with a first scanning line corresponding to the each row of pixel units, and the first scanning line corresponding to each row of pixel units is connected to switch elements of first-type pixel units in the each row of pixel units; and the second side of each row of pixel units is provided with a second scanning line corresponding to the each row of pixel units, and the second scanning line corresponding to each row of pixel units is connected to switch elements of second-type pixel units in the each row of pixel units; wherein the switch elements of the first-type pixel units in each row of pixel units are disposed on one side of the each row of pixel units close to the first scanning line corresponding to the each row of pixel units, and the switch elements of the second-type pixel units in each row of pixel units are disposed on one side of the each row of pixel units close to the second scanning line corresponding to the each row of pixel units; and wherein in a direction perpendicular to the row direction, an active layer structure of a switch element of a second-type pixel unit in an ith row of pixel units has a common region with an active layer structure of a switch element of a first-type pixel unit in an $(i+1)^{th}$ row of pixel units, and the common region is located between the second scanning line corresponding to the $i^{th}$ row of pixel units and the first scanning line corresponding to the $(i+1)^{th}$ row of pixel units, wherein i is an integer greater than or equal to 1.

18. A display panel of claim 17, further comprising: an opposite substrate disposed oppositely to the array substrate and a liquid crystal layer located between the array substrate and the opposite substrate.

19. A display device, comprising a display panel;

wherein the display panel comprises an array substrate, the array substrate comprises a substrate and a pixel unit array disposed on the substrate, and each pixel unit in the pixel unit array comprises a pixel electrode and a switch element;

wherein the substrate is further provided with scanning lines arranged in a row direction and data lines arranged in a column direction, two of the scanning lines are disposed between two adjacent rows of pixel units, and one of the data lines is disposed between two adjacent columns of pixel units; a control end of the switch element is connected to one of the scanning lines corresponding to the switch element, a first end of the switch element is connected to one of the data lines corresponding to the switch element, and a second end of the switch element is connected to the pixel electrode of a pixel unit to which the switch element belongs;

wherein each row of pixel units comprise a first side and a second side opposite to each other, the first side of each row of pixel units is provided with a first scanning line corresponding to the each row of pixel units, and the first scanning line corresponding to each row of pixel units is connected to switch elements of first-type pixel units in the each row of pixel units; and the second side of each row of pixel units is provided with a second scanning line corresponding to the each row of pixel units, and the second scanning line corresponding to each row of pixel units is connected to switch elements of second-type pixel units in the each row of pixel units; wherein the switch elements of the first-type pixel units in each row of pixel units are disposed on one side of the each row of pixel units close to the first scanning line corresponding to the each row of pixel units, and the switch elements of the second-type pixel units in each row of pixel units are disposed on one side of the each row of pixel units close to the second scanning line corresponding to the each row of pixel units; and wherein in a direction perpendicular to the row direction, an active layer structure of a switch element of a second-type pixel unit in an $i^{th}$ row of pixel units has a common region with an active layer structure of a switch element of a first-type pixel unit in an $(i+1)^{th}$ row of pixel units, and the common region is located between the second scanning line corresponding to the $i^{th}$ row of pixel units and the first scanning line corresponding to the $(i+1)^{th}$ row of pixel units, wherein i is an integer greater than or equal to 1.

20. The display device of claim 19, wherein the display device is an in-vehicle display device.

\* \* \* \* \*